(12) United States Patent
Yeh et al.

(10) Patent No.: US 8,000,032 B2
(45) Date of Patent: Aug. 16, 2011

(54) INTERNALLY FOCUSING LENS SYSTEM

(75) Inventors: Chao-Yi Yeh, Miao-Li Hsien (TW);
Jyh-Long Chern, Miao-Li Hsien (TW);
Wen-Jang Jiang, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 5 days.

(21) Appl. No.: 12/609,134

(22) Filed: Oct. 30, 2009

(65) Prior Publication Data

US 2010/0220397 A1 Sep. 2, 2010

(30) Foreign Application Priority Data

Feb. 27, 2009 (CN) .......................... 2009 1 0300612

(51) Int. Cl.
*G02B 13/18* (2006.01)
*G02B 9/34* (2006.01)

(52) U.S. Cl. ........................................ 359/715; 359/779

(58) Field of Classification Search .................. 359/689, 359/690, 687, 686, 715, 734, 714, 779
See application file for complete search history.

(56) References Cited

U.S. PATENT DOCUMENTS

| | | | | |
|---|---|---|---|---|
| 5,071,235 A * | 12/1991 | Mori et al. | ..................... | 359/692 |
| 6,259,508 B1 * | 7/2001 | Shigematsu | ..................... | 355/53 |
| 2002/0126383 A1* | 9/2002 | Hayakawa | ..................... | 359/557 |
| 2011/0002057 A1* | 1/2011 | Sato | ..................... | 359/824 |

* cited by examiner

*Primary Examiner* — Scott J Sugarman
(74) *Attorney, Agent, or Firm* — Raymond J. Chew

(57) ABSTRACT

An exemplary internally focusing lens system includes, in order from the object side to the image side, a first lens group with positive refractive power, a second lens group with negative refractive power, and a third lens group with positive refractive power. The third lens group includes one lens element. The second lens group is movable toward the image side and the first and third lens groups remain stationary during focusing of the lens system from an infinitely distant object to a nearby object.

16 Claims, 29 Drawing Sheets

INTERNALLY FOCUSING LENS SYSTEM

BACKGROUND

1. Technical Field

The present disclosure relates to lens systems, and particularly to an internally focusing lens system in which focusing is accomplished by moving an inner lens group or groups within the whole lens system.

2. Description of Related Art

In a typical image-taking apparatus such as a camera in a mobile phone, there is an article called a macro lens or a micro lens (hereinafter referred to as a "macro lens"). Among image pickup systems in general, the macro lens is mainly used for close-up photography. In a typical macro lens system, focusing is performed by moving the entire lens unit or some lenses at ends of the lens unit toward or away from an object side. Hence, the overall length occupied by the lens unit changes. This limits design options, particularly design options directed towards more compact camera units.

Therefore, a lens system that can overcome the above-described deficiencies is desired.

BRIEF DESCRIPTION OF THE DRAWINGS

Many aspects of various preferred and exemplary embodiments can be better understood with reference to the following drawings. Components in a drawing are not necessarily drawn to scale, the emphasis instead being placed upon clearly illustrating the principles of various embodiments.

DETAILED DESCRIPTION

Embodiments will now be described in detail below, with reference to the drawings.

Figure 1:
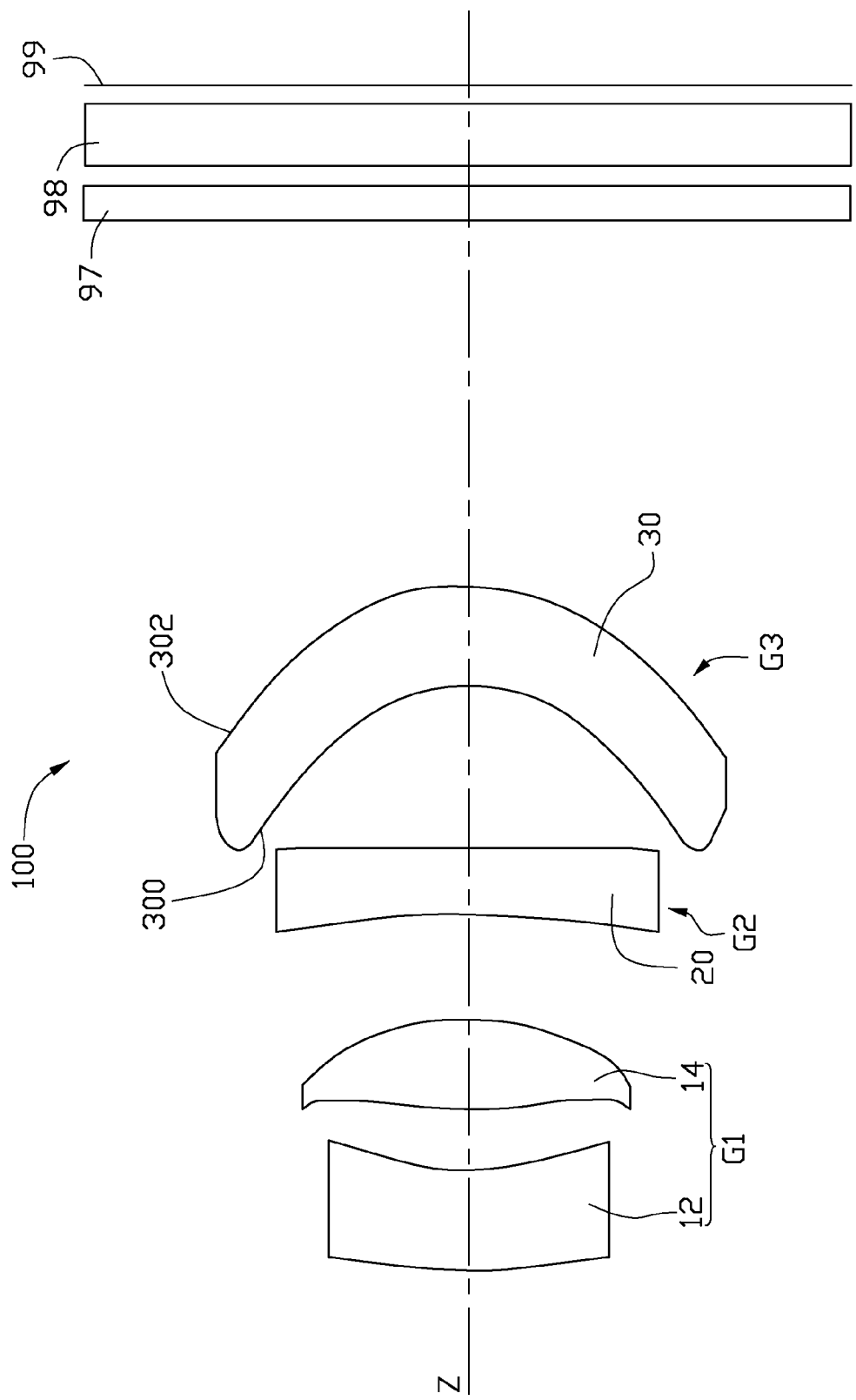
FIG. 1 is a schematic view of a lens system of an exemplary embodiment, the lens system including a first lens group, a second lens group, and a third lens group.

FIG. 1 shows general aspects of an internally focusing lens system 100 according to an exemplary embodiment of the present disclosure. The lens system 100 can be mounted on a body of an electronic device, such as a personal computer, a media player, a digital camera, etc. The lens system 100 includes, in order from an object side to an image plane 99, and situated on an optical axis Z, a first lens group G1 having positive refractive power, a second lens group G2 having negative refractive power, and a third lens group G3 having positive refractive power. The lens system 100 can further include a filter 97 and a glass panel 98 set between the third lens group G3 and the image plane 99.

When changing an object distance from infinity to a predetermined closest distance, the first lens group G1 and the third lens group G3 remain stationary on the optical axis Z, while the second lens group G2 moves toward the image plane 99 to carry out the focusing.

The first lens group G1 includes two first lenses 12, 14 having positive refractive power. At least one of the first lenses 12, 14 includes an aspherical surface. The second lens group G2 includes at least one second lens 20 having negative refractive power. The second lens 20 includes at least one aspherical surface. A material of the second lens 20 is selected from the group consisting of plastics, polymers, glasses, ceramics, liquid material, liquid crystal, and any suitable mixture or combination thereof. The third lens group G3 includes a final third lens 30 having positive refractive power. The third lens 30 includes a first surface 300 on the object side and a second surface 302 on the image side.

The lens system 100 satisfies the following conditional expressions:

$$0.4 < |F/F3| < 5 \tag{1}$$

$$0.2 < |FM/F3| < 2.5 \tag{2}$$

$$0.1 < |D/TTL| < 0.3 \tag{3}$$

$$1 < X < 6, \ X = (R1 - R2)/(R1 + R2) \tag{4}$$

wherein F is a focal length of the entire lens system 100 at the time of focusing of an infinitely distant object; FM is a focal length of the entire lens system 100 at the time of focusing of a nearby object; D is a distance between the second lens group G2 and the third lens group G3 at the time of focusing of the infinitely distant object; TTL is a total track length of the entire lens system 100 ranging from 5 millimeters to 10 millimeters; and F3 is a focal length of the third lens group G3. Conditional expression (4) establishes a desired range for the shape factor (R1−R2)/(R1+R2) of the third lens 30, where R1 is the radius of the first surface 300 of the third lens 30, and R2 is the radius of the second surface 302 of the third lens 30.

The first condition (1) together with the second condition (2) are for compensating astigmatism, distortion, and chromatic aberration of the lens system 100 by providing the relationship between the focal length of the entire lens system 100 at the time of focusing to infinity and the focal length of the third lens group G3, and providing the relationship between the focal length of the entire lens system 100 at the time of focusing on a nearby object and the focal length of the third lens group G3. The third condition (3) is for limiting the distance between the second lens group G2 and the third lens group G3 by providing the relationship between the TTL and the distance between the second lens group G2 and the third lens group G3 at the time of focusing of the infinitely distant object. The fourth condition (4) is for defining (restricting) the structure of the third lens 30 of the third lens group G3 by limiting the shape factor (R1−R2)/(R+R2).

As stated above, when the lens system 100 changes the object distance from the infinity position to the close-up position, the second lens group G2 moves toward the image plane 99 for focusing. The final lens, i.e. the third lens 30 in this embodiment, of the third lens group G3 is curved according to the fourth condition (4). This is to ensure high coverage over the image plane 99 for high mega pixel applications, and also to shorten the back focal length of the lens system 100, i.e. the distance between the second surface 302 of the third lens 30 and the image plane 99.

FIGS. 2-10, 12-20, and 21-29 provide astigmatism, distortion, and chromatic aberration graphs for three examples 1-3 of the lens system 100, respectively. In various of these drawings, S indicates a sagittal performance curve, T indicates a meridional performance curve, Px indicates a primary chromatic aberration performance curve, and Sx indicates a secondary chromatic aberration performance curve. In each of the examples, during focusing of the lens system 100 from an infinitely distant object to a nearby object, the first lens group G1 and the third lens group G3 are stationary in the direction of the optical axis Z; and the second lens group G2 is movable along the optical axis Z toward the image side for focusing of the lens system 100 from the infinitely distant object to the nearby object. The field of view (FOV) 2Ω of the lens system 100 in each example is 40 degrees, and the f-number ($F_{No}$) of the lens system 100 in each example equals 2.8.

In addition, in each of the examples, the surfaces of each lens element(s) are aspherical surfaces. The aspheric coefficient of each lens surface follows the formula:

$$Z = \frac{ch^2}{1 + \sqrt{1 - (k+1)c^2h^2}} + \sum A_i h^i,$$

wherein "c" is a curvature of the corresponding lens surface, "k" is a conic constant, "h" is a distance between a point on the optical axis Z and a point on the corresponding lens surface, "i" is a natural number, and "$A_i$" is the ith order of the aspherical coefficient of the corresponding surface.

In Tables 1, 3, and 5 shown below, the first column indicates surface numbers beginning on the object side (left side in FIG. 1). Corresponding radii of curvature R of the lens surfaces are provided in the second column, axial distances D between adjacent lens surfaces are provided in the third column, respective refractive index values $N_d$ for the lenses are provided in the fourth column, and respective Abbe numbers $V_d$ for the lenses are provided in the fifth column. The symbols "I", "II", "III" represent three different locations of the lens 20.

In Tables 2, 4, and 6, shown below, the first column indicates surface numbers beginning on the object side (left side in FIG. 1). Corresponding aspheric surface data of the lens surfaces are provided in the second column, wherein "$A_i$" designates the ith order of the aspherical coefficient of the corresponding surface.

Referring to FIGS. 2-11 and Tables 1-2, in the first example, the third lens group G3 is rather curved such that the marginal rays are well guided to the boundary of the image plane 99. On the other hand, the second lens group G2 is flat compared to the other lens groups G1, G3. Three focal lengths of the entire lens system 100 corresponding to the three different locations I, II, III of the second lens 20 are FI, FII, and FIII, wherein FI=3.846618 mm, FII=3.845022 mm, and FIII=3.804752 mm. The basic lens prescription is shown in Table 1, and the values of the corresponding aspheric coefficients are shown in Table 2.

TABLE 1

| surface number | R (mm) | D (mm) | $N_d$ | $V_d$ |
| --- | --- | --- | --- | --- |
| 1st surface of lens 12 | 3.125 | 0.796 | 1.63200 | 23.00000 |
| 2nd surface of lens 12 | 5.230 | 0.461 | — | — |
| 1st surface of lens 14 | 2.334 | 0.719 | 1.49000 | 55.30000 |
| 2nd surface of lens 14 | −2.877 | I 0.784 | — | — |
| | | II 0.817 | — | — |
| | | III 1.150 | — | — |
| 1st surface of lens 20 | −7.721 | 0.500 | 1.58600 | 29.90000 |
| 2nd surface of lens 20 | 20.380 | I 1.326 | — | — |
| | | II 1.293 | — | — |
| | | III 0.960 | — | — |
| 1st surface of lens 30 | 3.841 | 0.791 | 1.49000 | 55.30000 |
| 2nd surface of lens 30 | −2.229 | 2.831 | — | — |
| 1st surface of filter 97 | ∞ | 0.300 | 1.52300 | 55.00000 |
| 2nd surface of filter 97 | ∞ | 0.145 | — | — |
| 1st surface of glass panel 98 | ∞ | 0.500 | 1.51680 | 64.16641 |
| 2nd surface of glass panel 98 | ∞ | — | — | — |
| image plane 99 | ∞ | — | — | — |

TABLE 2

| surface number | aspheric surface data |
| --- | --- |
| 1st surface of lens 12 | $A_2$ = 0.0065535; $A_4$ = −0.040930; $A_6$ = −0.022854; $A_8$ = 0.0033487; $A_{10}$ = 0.015696; $A_{12}$ = 0.014787; $A_{14}$ = −0.026647 |
| 2nd surface of lens 12 | $A_2$ = 0.17795; $A_4$ = −0.057971; $A_6$ = −0.030119; $A_8$ = 0.030683; $A_{10}$ = 0.0096079; $A_{12}$ = −0.023711; $A_{14}$ = 0.00053775 |
| 1st surface of lens 14 | $A_2$ = −0.087764; $A_4$ = −0.033467; $A_6$ = −0.013201; $A_8$ = 0.011734; $A_{10}$ = −0.0093868; $A_{12}$ = −0.00039337; $A_{14}$ = −0.0015459 |
| 2nd surface of lens 14 | $A_2$ = −0.059170; $A_4$ = −0.014836; $A_6$ = 0.0027275; $A_8$ = −0.0084803; $A_{10}$ = 0.0045958; $A_{12}$ = −0.0027059; $A_{14}$ = −0.00079924 |
| 1st surface of lens 20 | k = 0.8344; $A_2$ = 0.00065389; $A_4$ = −0.011439; $A_6$ = 0.00017846; $A_8$ = −0.00071507; $A_{10}$ = 0.00011121; $A_{12}$ = 0.00022085; $A_{14}$ = 0.00013567 |
| 2nd surface of lens 20 | k = −1.0000; $A_2$ = −0.021010; $A_4$ = −0.0048358; $A_6$ = −0.0025447; $A_8$ = 0.00018632; $A_{10}$ = 0.00018669; $A_{12}$ = 0.000071492; $A_{14}$ = 0.000032328 |
| 1st surface of lens 30 | $A_2$ = −0.49794; $A_4$ = −0.023538; $A_6$ = −0.0047894; $A_8$ = 0.0025537; $A_{10}$ = −0.0023137; $A_{12}$ = 0.00062254; $A_{14}$ = 0.000024861 |
| 2nd surface of lens 30 | $A_2$ = −0.075278; $A_4$ = 0.0055584; |

TABLE 2-continued

| surface number | aspheric surface data |
| --- | --- |
| | $A_6 = -0.0068646; A_8 = 0.0042890;$ |
| | $A_{10} = -0.0012938; A_{12} = 0.00017539;$ |
| | $A_{14} = -0.0000028002$ |

Figure 2:
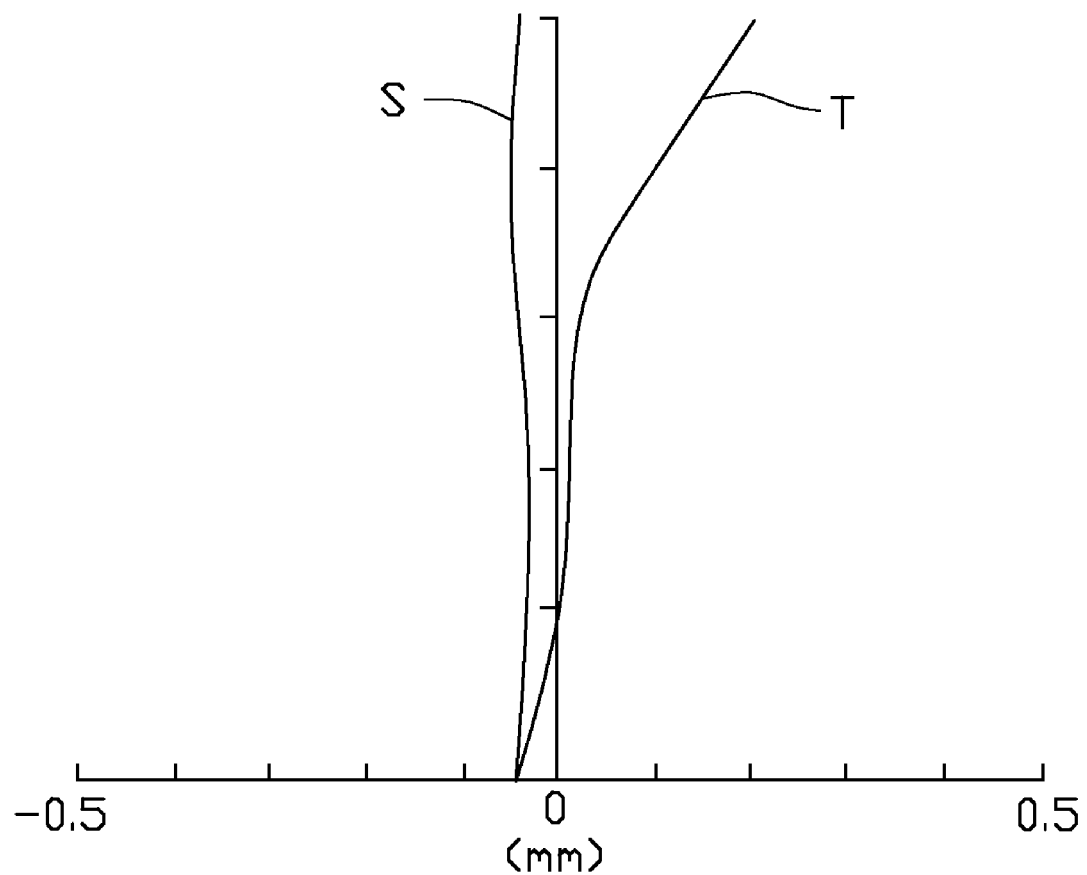
FIGS. 2-4 are graphs of astigmatism measurements in a first example of the lens system of FIG. 1, when the second lens group is at three different locations, respectively, wherein S indicates a sagittal performance curve and T indicates a meridional performance curve.
Figure 3:
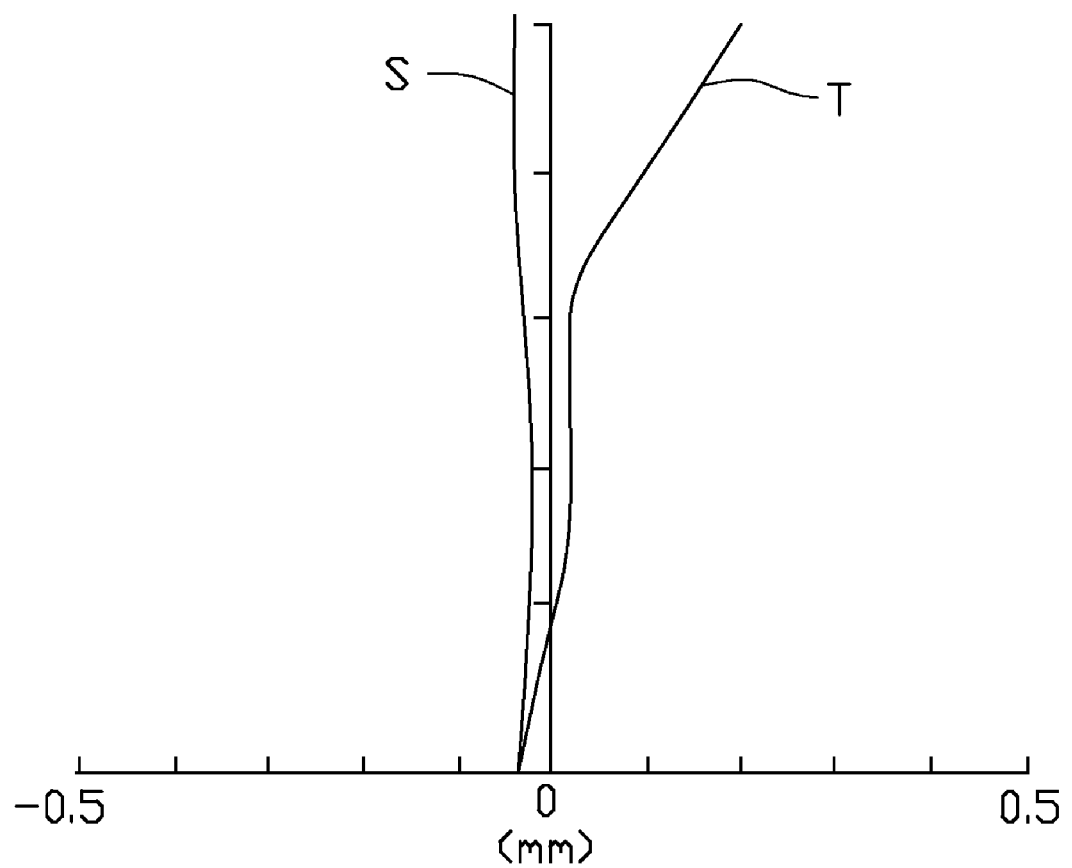
Figure 4:
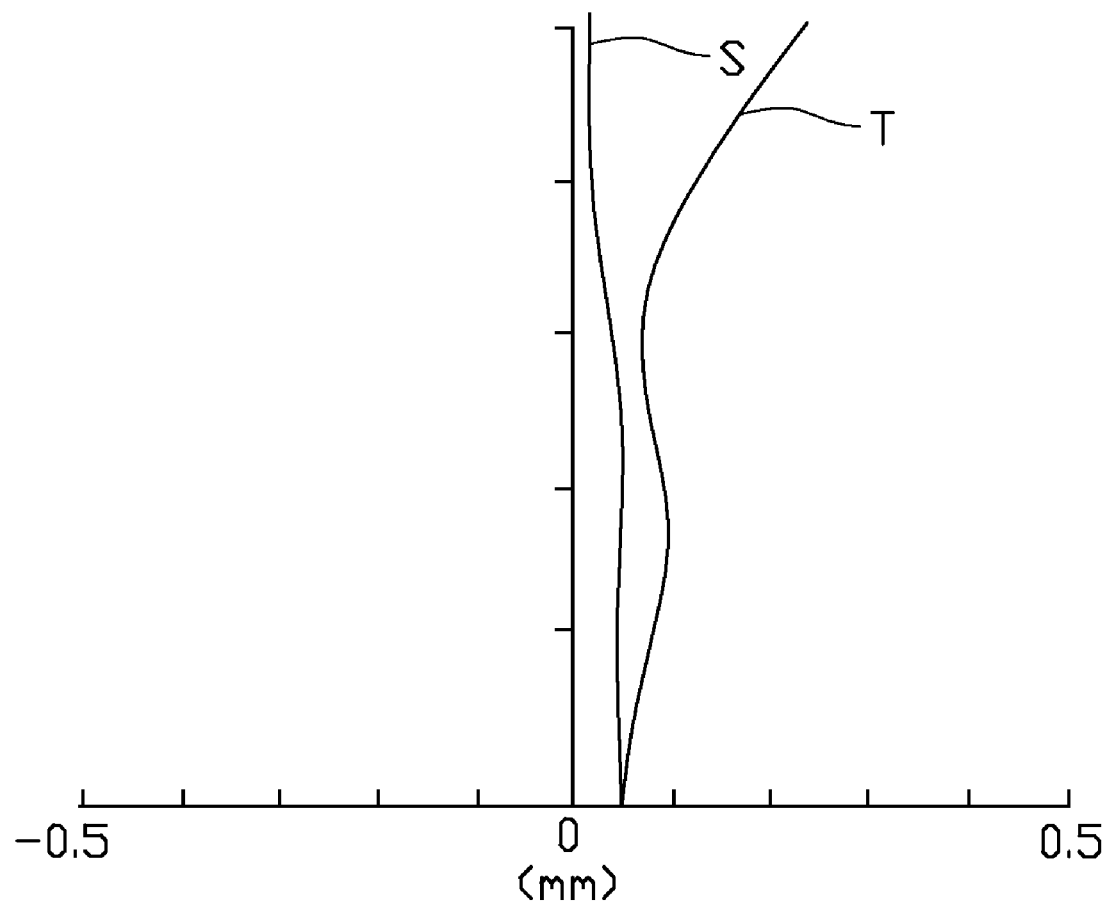
Figure 5:
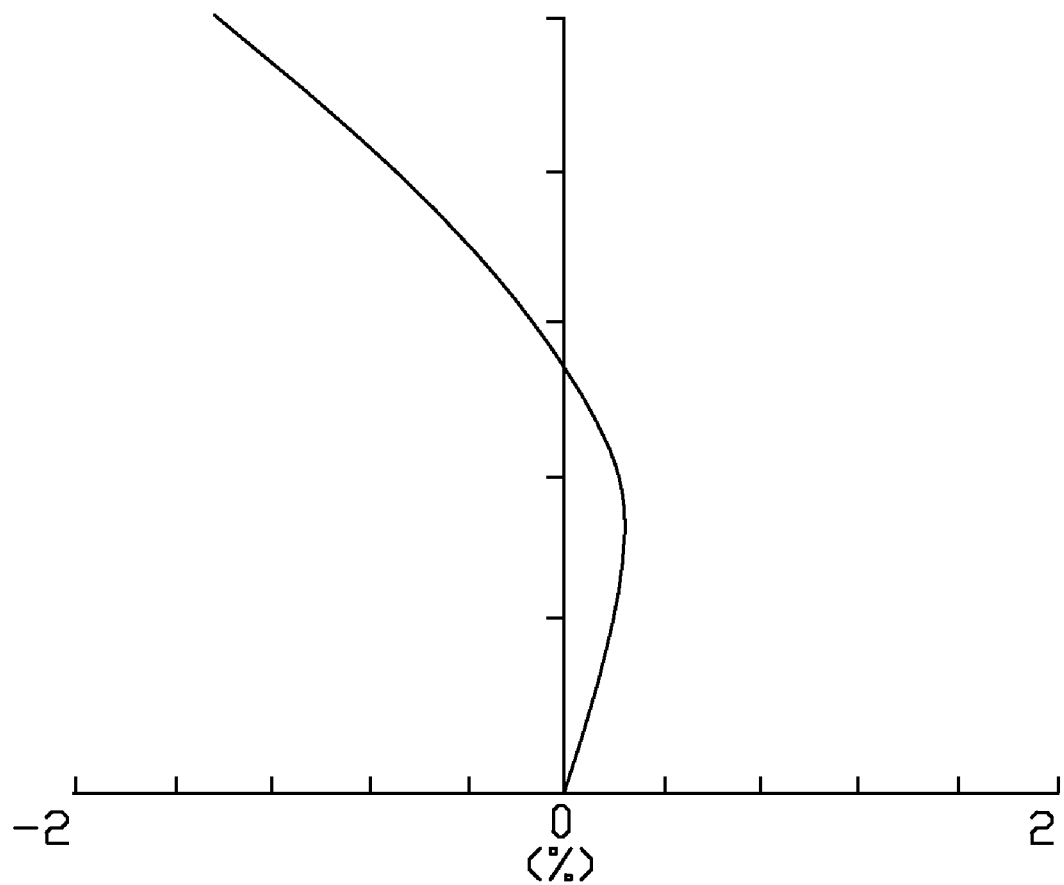
FIGS. 5-7 are graphs of distortion measurements in the first example of the lens system of FIG. 1, when the second lens group is at the three different locations, respectively.
Figure 6:
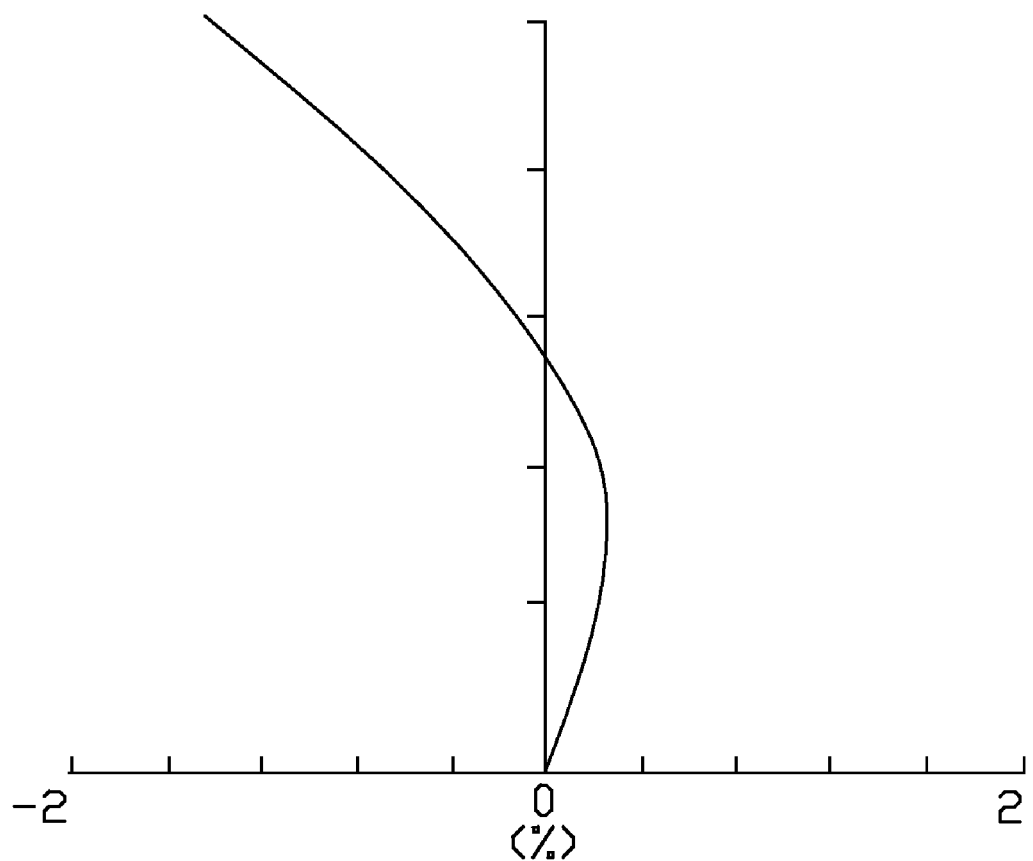
Figure 7:
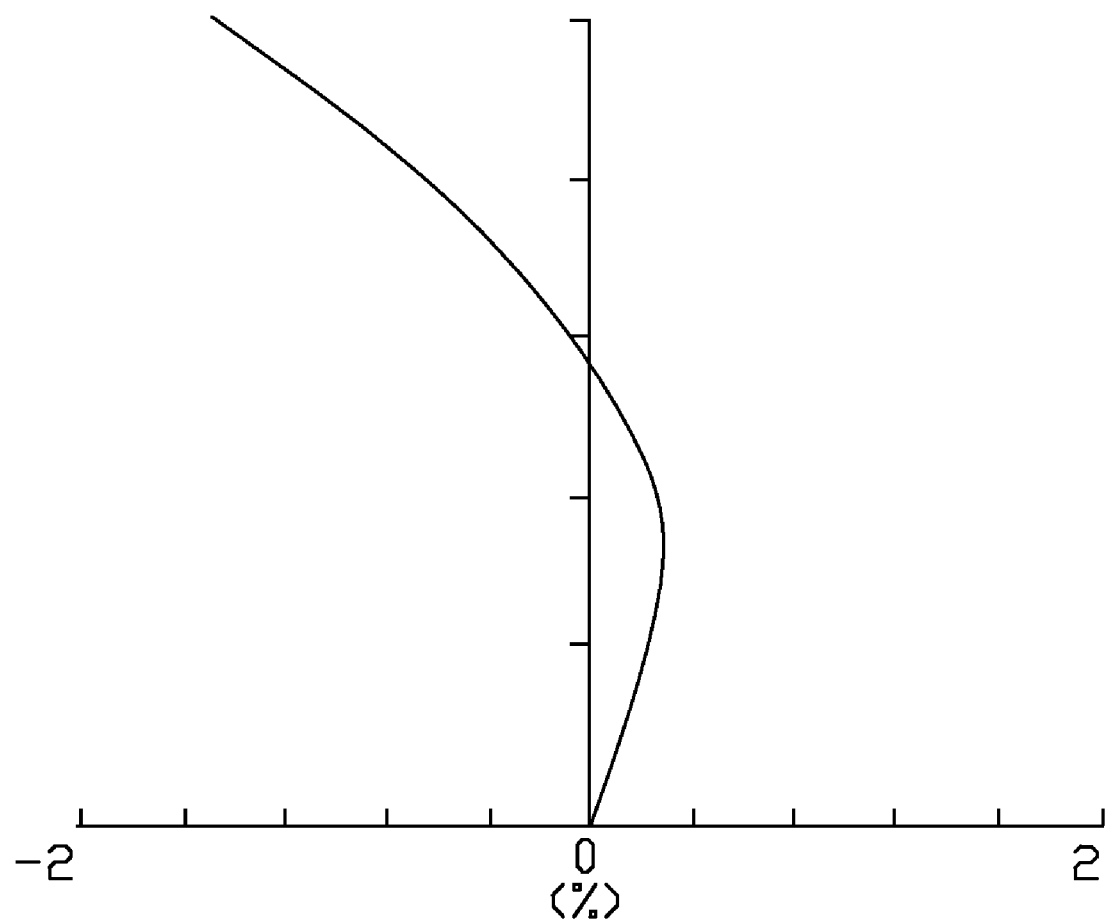
Figure 8:
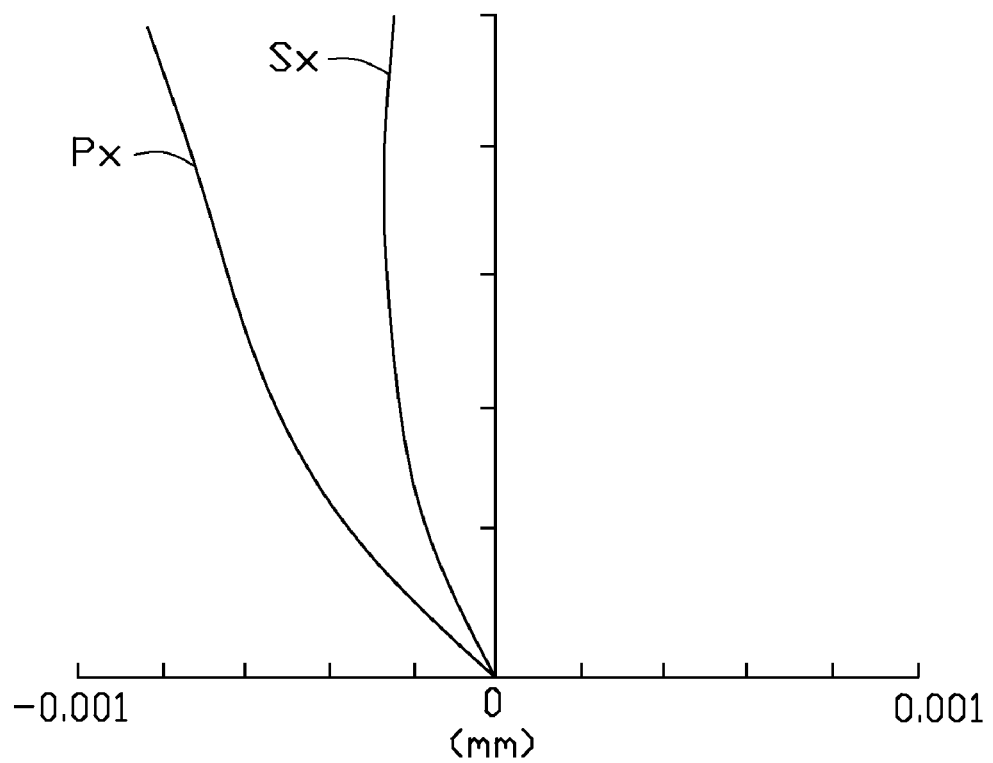
FIGS. 8-10 are graphs of chromatic aberration measurements in the first example of the lens system of FIG. 1, when the second lens group is at the three different locations, respectively, wherein Px indicates a primary chromatic aberration performance curve and Sx indicates a secondary chromatic aberration performance curve.
Figure 9:
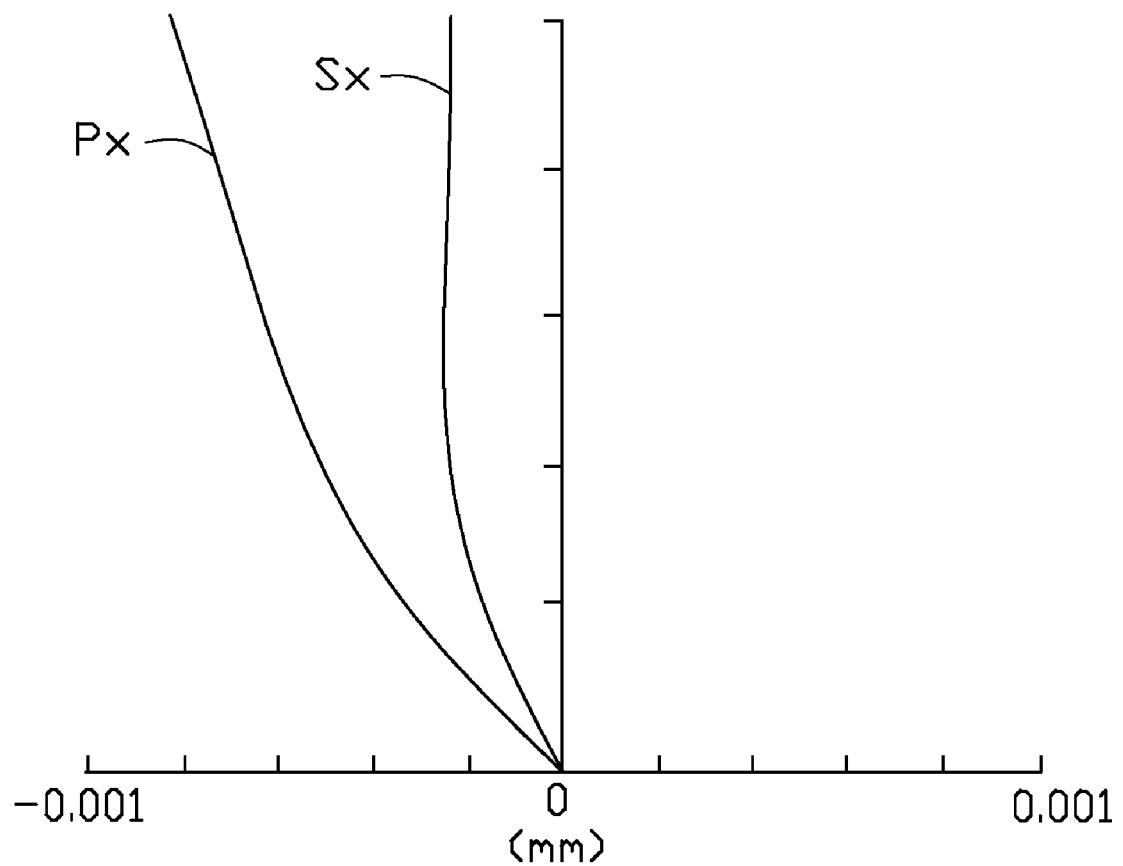
Figure 10:
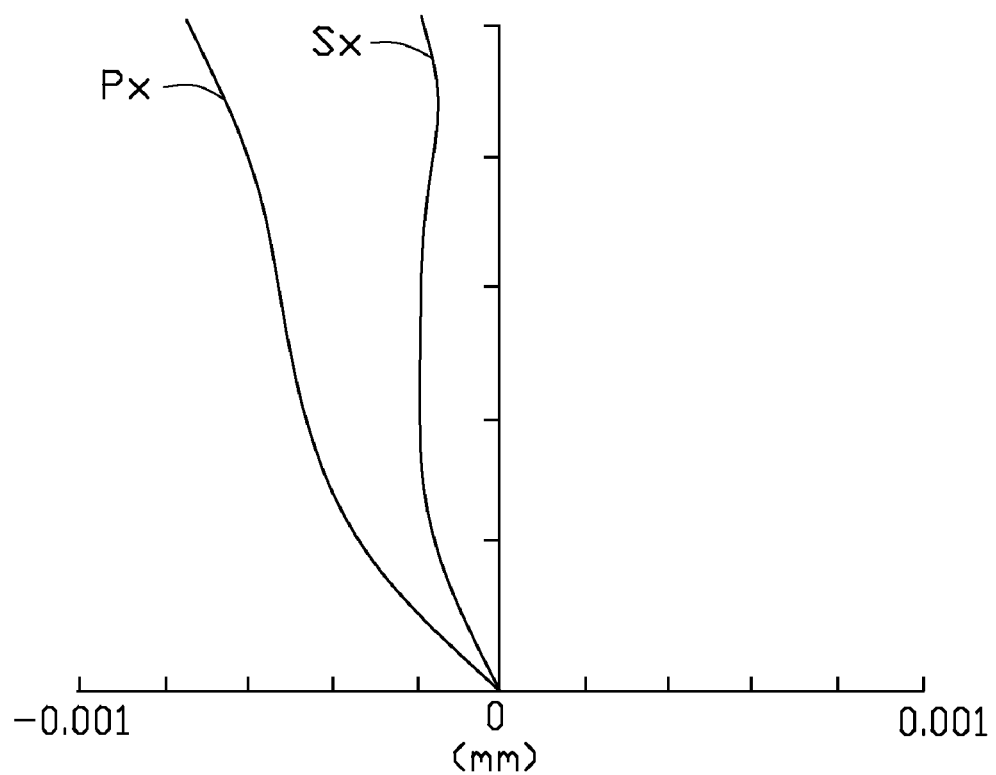
Figure 11:
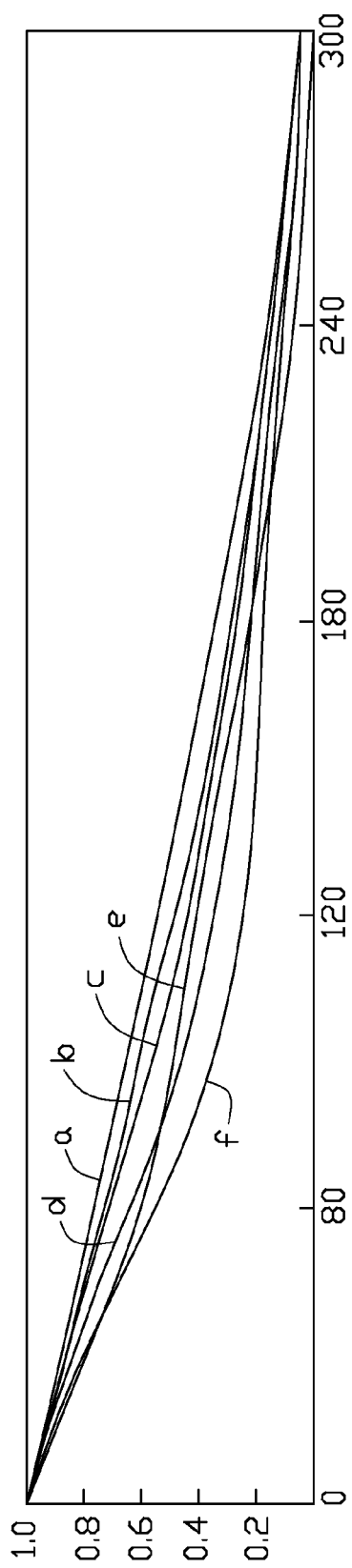
FIG. 11 is a diagram of modulation transfer function (MTF) in the first example of the lens system of FIG. 1 when the second lens group is at one of the three different locations.

FIGS. 2-4 show that the sagittal astigmatism and the meridional astigmatism of the lens system 100 are maintained in a range from about −0.5 mm to about 0.5 mm. FIGS. 5-7 show that the lens system 100 has a high optical performance with distortion less than 2%. FIGS. 8-10 show that the primary chromatic aberration and the secondary chromatic aberration of the lens system 100 are maintained in a range from about −0.001 mm to about 0.001 mm. In addition, FIG. 11 shows a diagram of MTF of the lens system 100 when the second lens group G2 is at the location I, wherein "a" is a theoretical MTF curve, "c" is an on-axis MTF curve, "b" and "d" are two off-axis MTF curves (28 degree FOV), and "e" and "f" are two off-axis MTF curves (40 degrees FOV). FIG. 11 shows that the values of the off-axis MTF curves are very close to those of the on-axis MTF curves.

Referring to FIGS. 12-20 and Tables 3-4, in the second example, the conic constant "k" is free, and FI=3.844828 mm, FII=3.843228 mm, and FIII=3.802954 mm. The basic lens prescription is shown in Table 3, and the values of the corresponding aspheric coefficients are shown in Table 4.

TABLE 3

| surface number | R (mm) | D (mm) | $N_d$ | $V_d$ |
| --- | --- | --- | --- | --- |
| $1^{st}$ surface of lens 12 | 3.125 | 0.796 | 1.63200 | 23.00000 |
| $2^{nd}$ surface of lens 12 | 5.230 | 0.461 | — | — |
| $1^{st}$ surface of lens 14 | 2.334 | 0.719 | 1.49000 | 55.30000 |
| $2^{nd}$ surface of lens 14 | −2.878 | I 0.784 | — | — |
| | | II 0.817 | — | — |
| | | III 1.150 | — | — |
| $1^{st}$ surface of lens 20 | −7.721 | 0.500 | 1.58600 | 29.90000 |
| $2^{nd}$ surface of lens 20 | 20.398 | I 1.326 | — | — |
| | | II 1.293 | — | — |
| | | III 0.960 | — | — |
| $1^{st}$ surface of lens 30 | 3.840 | 0.789 | 1.49000 | 55.30000 |
| $2^{nd}$ surface of lens 30 | −2.300 | 2.830 | — | — |
| $1^{st}$ surface of filter 97 | ∞ | 0.300 | 1.52300 | 55.00000 |
| $2^{nd}$ surface of filter 97 | ∞ | 0.144 | — | — |
| $1^{st}$ surface of glass panel 98 | ∞ | 0.500 | 1.51680 | 64.16641 |
| $2^{nd}$ surface of glass panel 98 | ∞ | — | — | — |
| image plane 99 | ∞ | — | — | — |

TABLE 4

| surface number | aspheric surface data |
| --- | --- |
| $1^{st}$ surface of lens 12 | $A_2 = 0.0065523; A_4 = -0.040928;$ |
| | $A_6 = -0.022860; A_8 = 0.0033381;$ |
| | $A_{10} = 0.015694; A_{12} = 0.014819;$ |
| | $A_{14} = -0.026544$ |
| $2^{nd}$ surface of lens 12 | $A_2 = 0.17795; A_4 = -0.057970;$ |
| | $A_6 = -0.030117; A_8 = 0.030679;$ |
| | $A_{10} = 0.0096027; A_{12} = -0.023707;$ |
| | $A_{14} = 0.00056285$ |
| $1^{st}$ surface of lens 14 | $A_2 = -0.087770; A_4 = -0.033475;$ |
| | $A_6 = -0.013211; A_8 = 0.011731;$ |
| | $A_{10} = -0.0093858; A_{12} = -0.00039124;$ |
| | $A_{14} = -0.0015450$ |
| $2^{nd}$ surface of lens 14 | $A_2 = -0.059177; A_4 = -0.014828;$ |
| | $A_6 = 0.0027340; A_8 = -0.0084762;$ |
| | $A_{10} = 0.0045967; A_{12} = -0.0027066;$ |
| | $A_{14} = -0.00080014$ |

TABLE 4-continued

| surface number | aspheric surface data |
| --- | --- |
| $1^{st}$ surface of lens 20 | $A_2 = 0.00066102; A_4 = -0.011465;$ |
| | $A_6 = 0.00016923; A_8 = -0.00071869;$ |
| | $A_{10} = 0.00010998; A_{12} = 0.00022057;$ |
| | $A_{14} = 0.00013570$ |
| $2^{nd}$ surface of lens 20 | $A_2 = -0.021042; A_4 = -0.0048240;$ |
| | $A_6 = -0.0025401; A_8 = 0.00018780;$ |
| | $A_{10} = 0.00018702; A_{12} = 0.000071488;$ |
| | $A_{14} = 0.000032260$ |
| $1^{st}$ surface of lens 30 | $A_2 = -0.49794; A_4 = -0.023535;$ |
| | $A_6 = -0.0047876; A_8 = 0.0025550;$ |
| | $A_{10} = -0.0023131; A_{12} = 0.00062265;$ |
| | $A_{14} = 0.000024765$ |
| $2^{nd}$ surface of lens 30 | $A_2 = -0.075498; A_4 = 0.0055801;$ |
| | $A_6 = -0.0068611; A_8 = 0.0042893;$ |
| | $A_{10} = -0.0012938; A_{12} = 0.00017539;$ |
| | $A_{14} = -0.0000028002$ |

Figure 12:
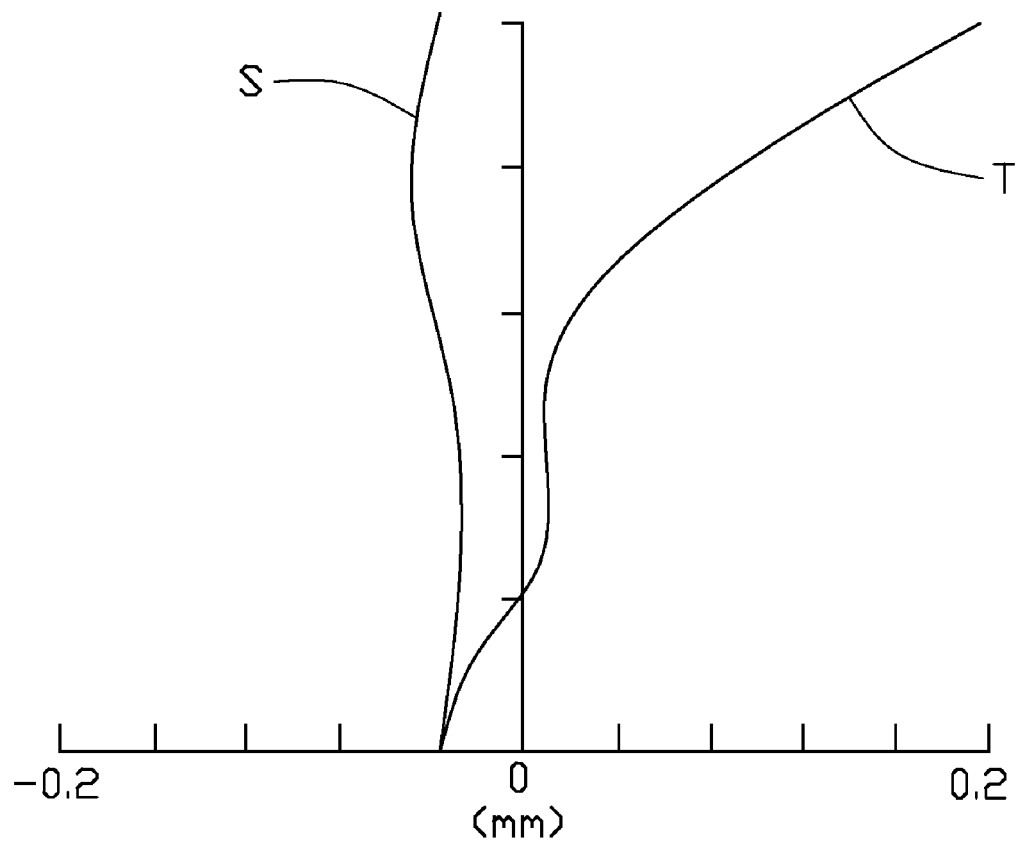
FIGS. 12-14 are graphs of astigmatism measurements in a second example of the lens system of FIG. 1, when the second lens group is at three different locations, respectively, wherein S indicates a sagittal performance curve and T indicates a meridional performance curve.
Figure 13:
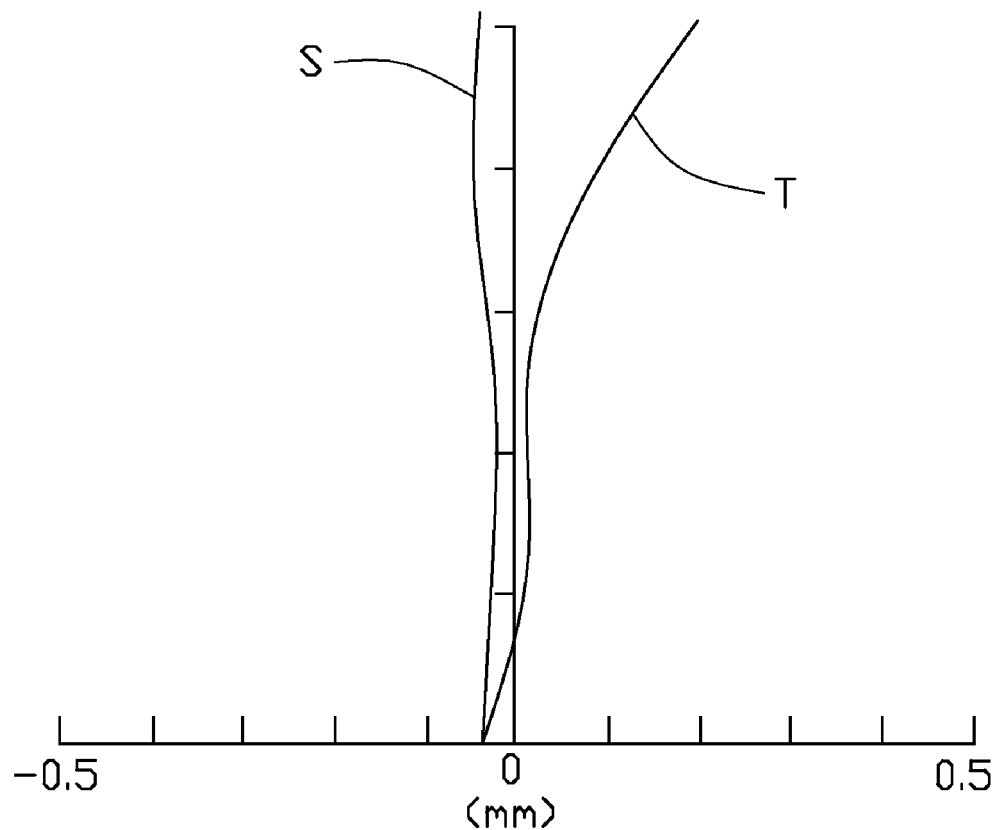
Figure 14:
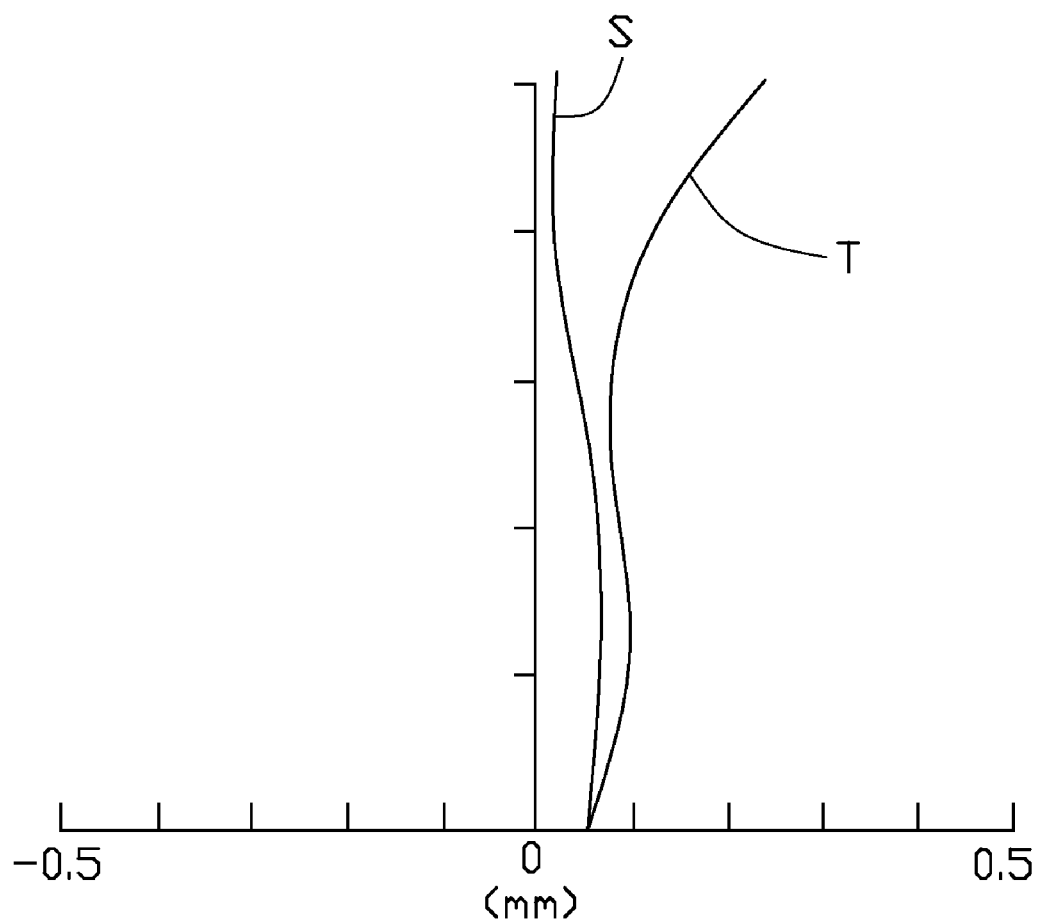
Figure 15:
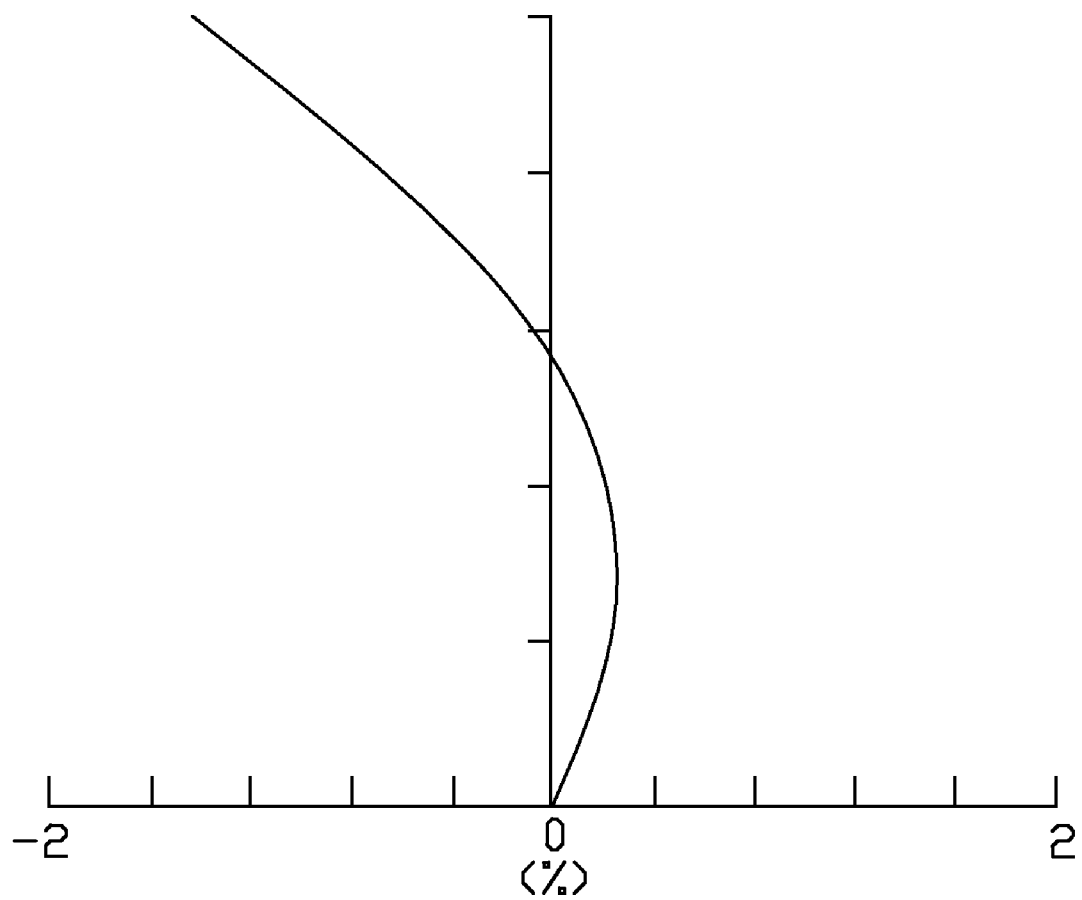
FIGS. 15-17 are graphs of distortion measurements in the second example of the lens system of FIG. 1, when the second lens group is at the three different locations, respectively.
Figure 16:
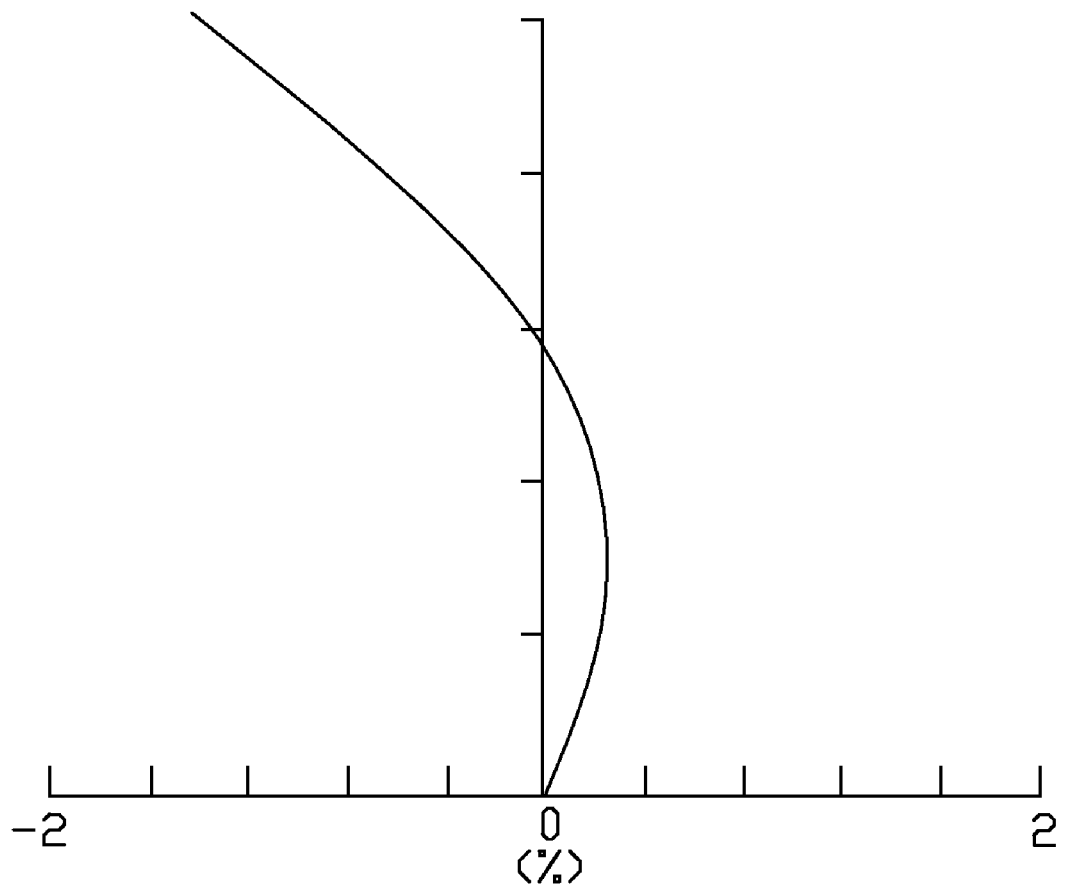
Figure 17:
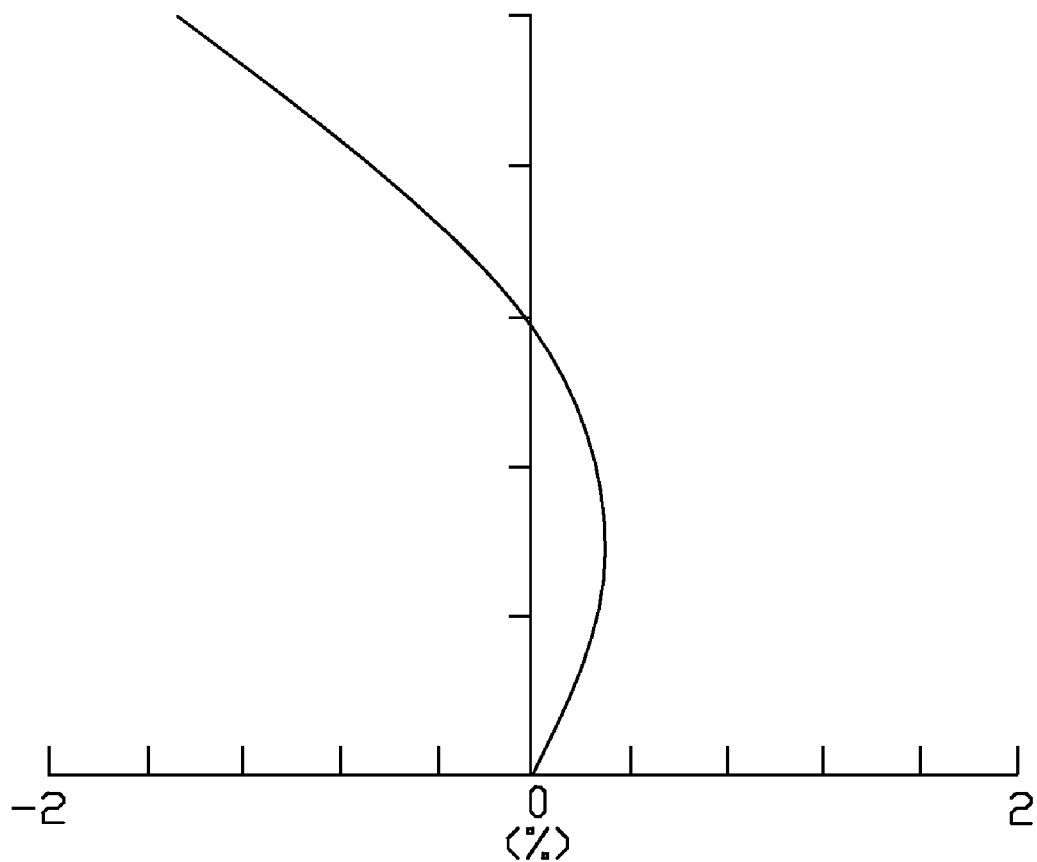
Figure 18:
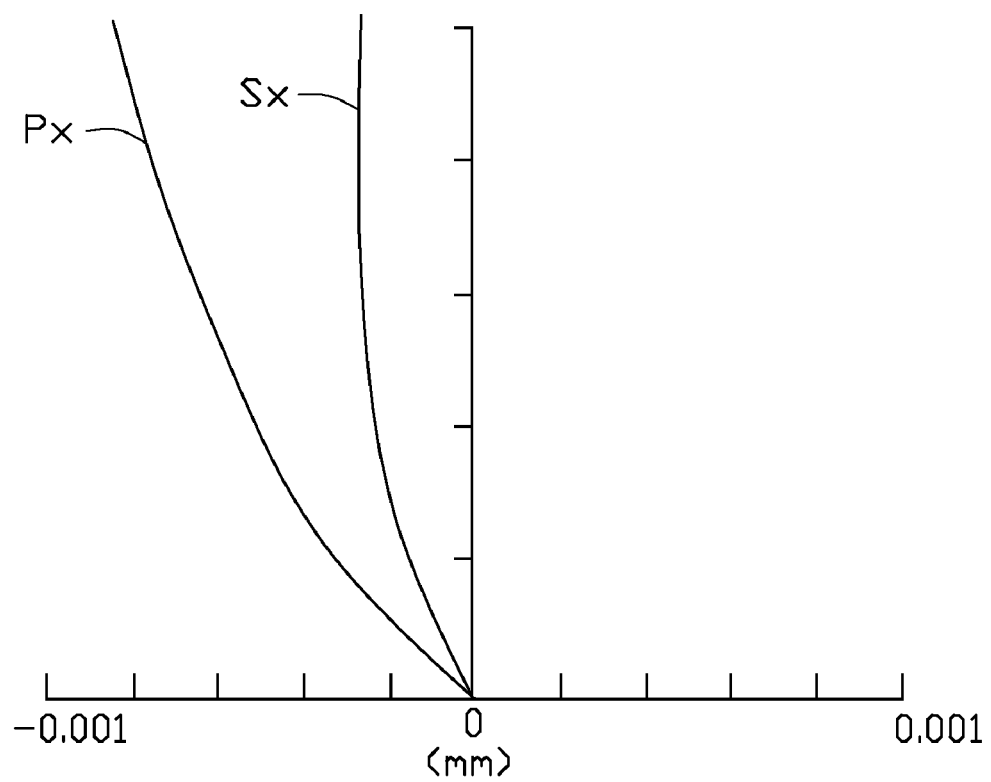
FIGS. 18-20 are graphs of chromatic aberration measurements in the second example of the lens system of FIG. 1, when the second lens group is at the three different locations, respectively, wherein Px indicates a primary chromatic aberration performance curve and Sx indicates a secondary chromatic aberration performance curve.
Figure 19:
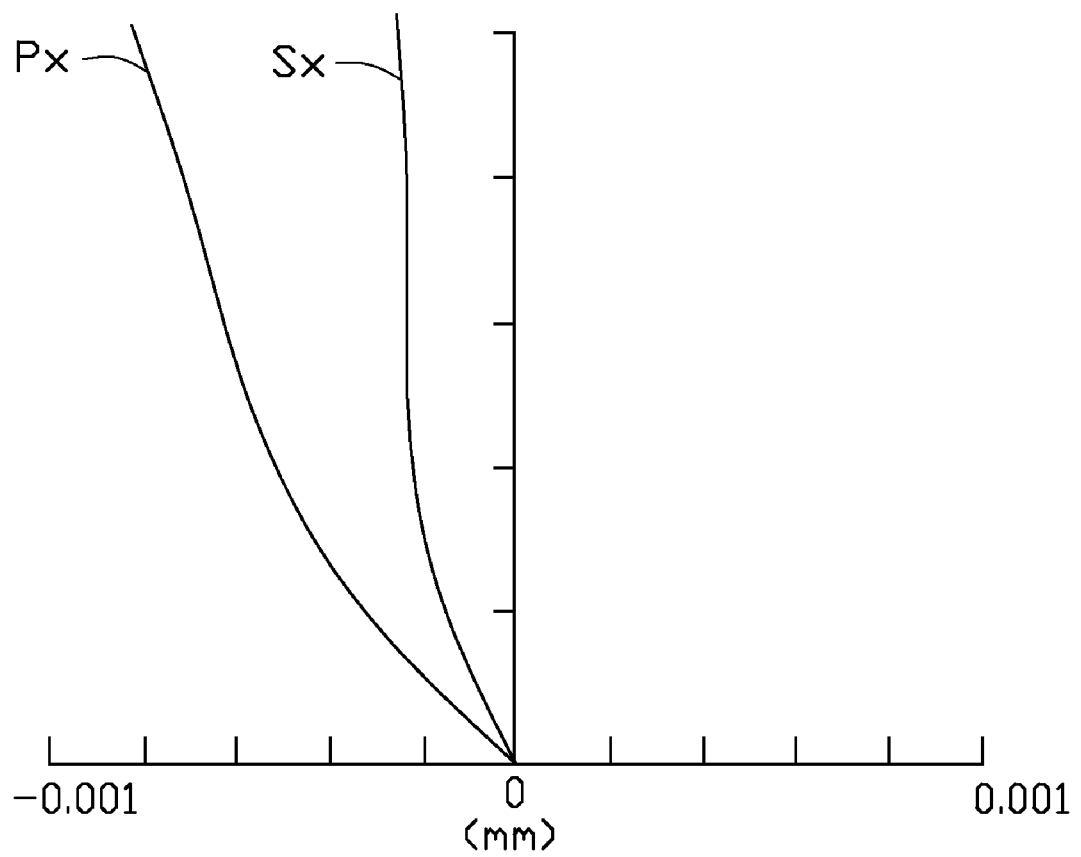
Figure 20:
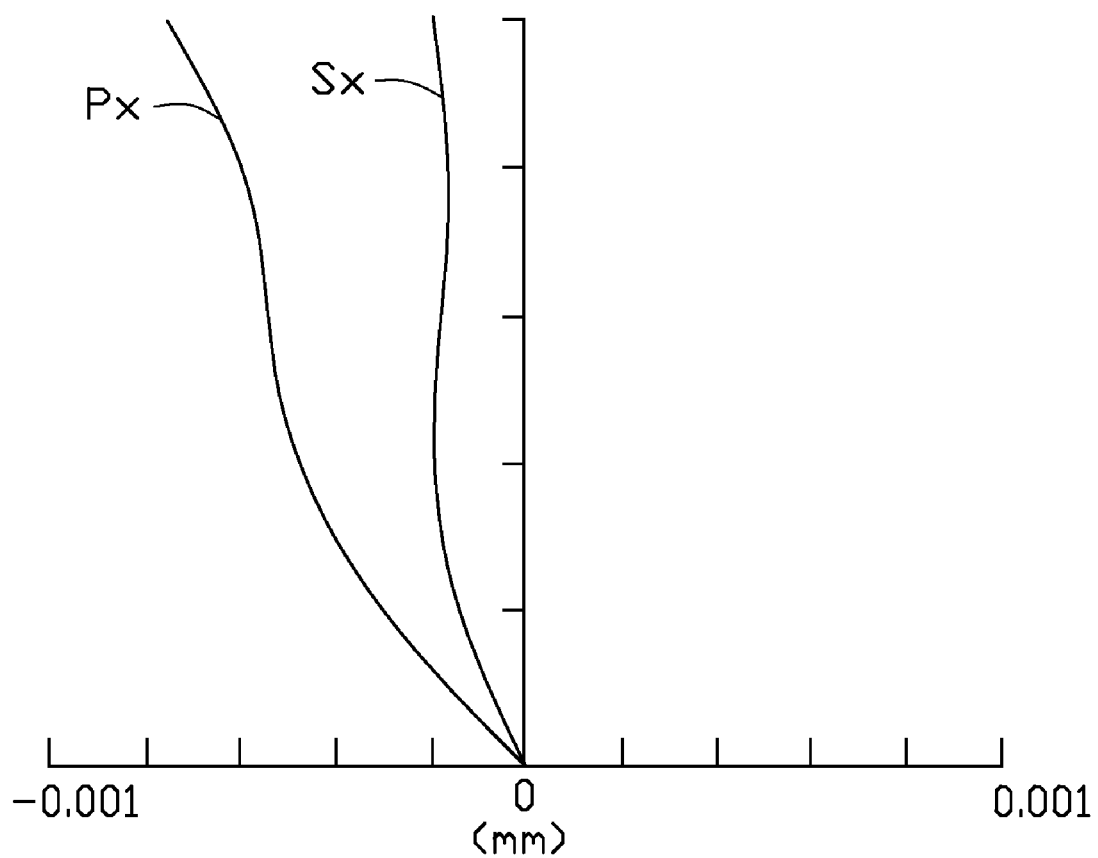

FIGS. 12-14 show that the sagittal astigmatism and the meridional astigmatism of the lens system 100 in the second example are maintained in a range from about −0.5 mm to about 0.5 mm. FIGS. 15-17 show that the lens system 100 in the second example has a high optical performance with distortion less than 2%. FIGS. 18-20 show that the primary chromatic aberration and the secondary chromatic aberration of the lens system 100 in the second example are maintained in a range from about −0.001 mm to about 0.001 mm.

Referring to FIGS. 21-29 and Tables 5-6, in the third example, glass material is used in the second lens 20, and FI=3.849204 mm, FII=3.84749 mm, and FIII=3.805011 mm. The basic lens prescription is shown in Table 5, and the values of the corresponding aspheric coefficients are shown in Table 6.

TABLE 5

| surface number | R (mm) | D (mm) | $N_d$ | $V_d$ |
| --- | --- | --- | --- | --- |
| $1^{st}$ surface of lens 12 | 3.122 | 0.792 | 1.63200 | 23.00000 |
| $2^{nd}$ surface of lens 12 | 5.239 | 0.467 | — | — |
| $1^{st}$ surface of lens 14 | 2.333 | 0.722 | 1.49000 | 55.30000 |
| $2^{nd}$ surface of lens 14 | −2.875 | I 0.797 | — | — |
| | | II 0.827 | — | — |
| | | III 1.150 | — | — |
| $1^{st}$ surface of lens 20 | −7.797 | 0.500 | 1.63200 | 23.00000 |
| $2^{nd}$ surface of lens 20 | 21.015 | I 1.313 | — | — |
| | | II 1.283 | — | — |
| | | III 0.960 | — | — |
| $1^{st}$ surface of lens 30 | 3.829 | 0.791 | 1.49000 | 55.30000 |
| $2^{nd}$ surface of lens 30 | −2.300 | 2.836 | — | — |
| $1^{st}$ surface of filter 97 | ∞ | 0.300 | 1.52300 | 55.00000 |
| $2^{nd}$ surface of filter 97 | ∞ | 0.147 | — | — |
| $1^{st}$ surface of glass panel 98 | ∞ | 0.500 | 1.51680 | 64.16641 |
| $2^{nd}$ surface of glass panel 98 | ∞ | — | — | — |
| image plane 99 | ∞ | — | — | — |

TABLE 6

| surface number | aspheric surface data |
| --- | --- |
| $1^{st}$ surface of lens 12 | $A_2 = 0.0067604; A_4 = -0.040875;$ |
| | $A_6 = -0.022993; A_8 = 0.0030744;$ |
| | $A_{10} = 0.015488; A_{12} = 0.015046;$ |
| | $A_{14} = -0.025295$ |
| $2^{nd}$ surface of lens 12 | $A_2 = 0.17775; A_4 = -0.058028;$ |
| | $A_6 = -0.030101; A_8 = 0.030633;$ |
| | $A_{10} = 0.0095435; A_{12} = -0.023659;$ |
| | $A_{14} = 0.00085161$ |
| $1^{st}$ surface of lens 14 | $A_2 = -0.087629; A_4 = -0.033467;$ |

TABLE 6-continued

| surface number | aspheric surface data |
|---|---|
| | $A_6 = -0.013301$; $A_8 = 0.011693$; $A_{10} = -0.0093739$; $A_{12} = -0.00036602$; $A_{14} = -0.0015300$ |
| 2$^{nd}$ surface of lens 14 | $A_2 = -0.059345$; $A_4 = -0.014898$; $A_6 = 0.0027397$; $A_8 = -0.0084523$; $A_{10} = 0.0046008$; $A_{12} = -0.0027160$; $A_{14} = -0.00081143$ |
| 1$^{st}$ surface of lens 20 | $A_2 = 0.0012261$; $A_4 = -0.011420$; $A_6 = 0.00015899$; $A_8 = -0.00073212$; $A_{10} = 0.00010461$; $A_{12} = 0.00022025$; $A_{14} = 0.00013705$ |
| 2$^{nd}$ surface of lens 20 | $A_2 = -0.021669$; $A_4 = -0.0049270$; $A_6 = -0.0025410$; $A_8 = 0.00019203$; $A_{10} = 0.00018866$; $A_{12} = 0.000071516$; $A_{14} = 0.000031893$ |
| 1$^{st}$ surface of lens 30 | $A_2 = -0.49730$; $A_4 = -0.023338$; $A_6 = -0.0047700$; $A_8 = 0.0025567$; $A_{10} = -0.0023139$; $A_{12} = 0.00062142$; $A_{14} = 0.000024342$ |
| 2$^{nd}$ surface of lens 30 | $A_2 = -0.075726$; $A_4 = 0.0054566$; $A_6 = -0.0068620$; $A_8 = 0.0042878$; $A_{10} = -0.0012948$; $A_{12} = 0.00017515$; $A_{14} = -0.0000027960$ |

Figure 21:
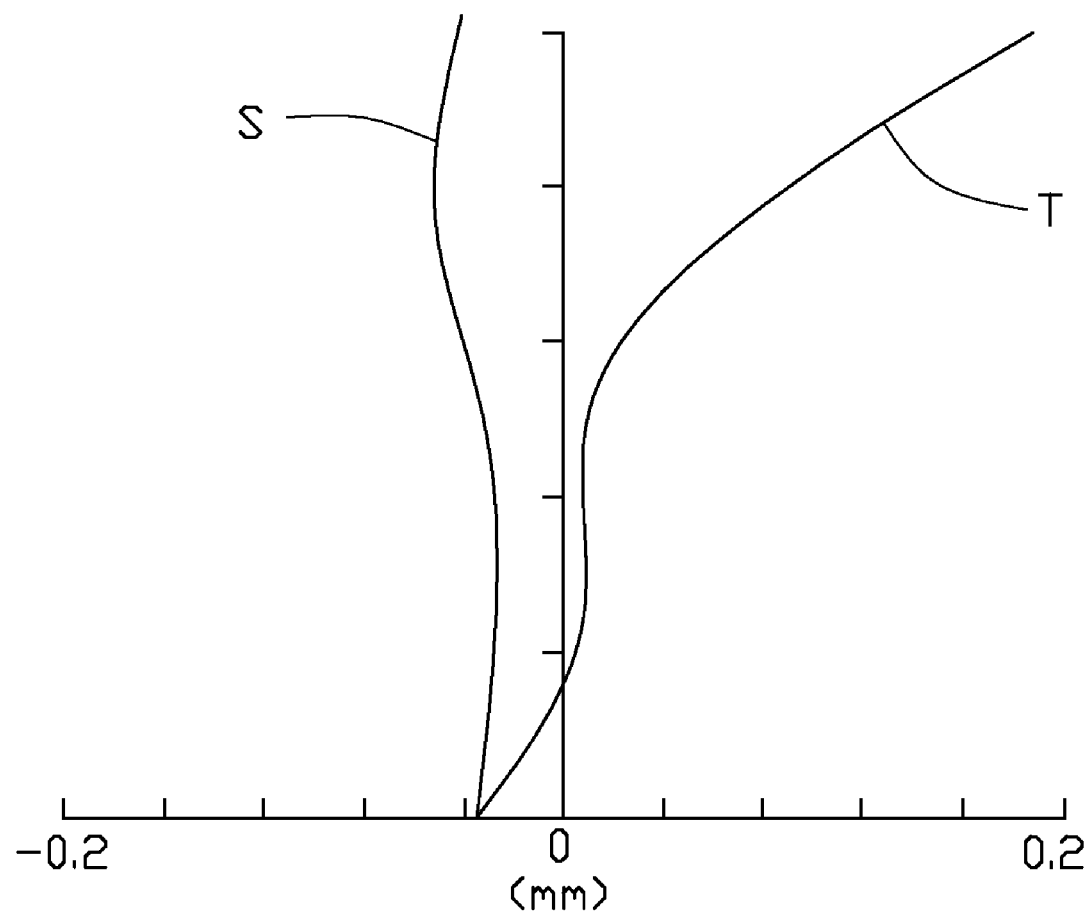
FIGS. 21-23 are graphs of astigmatism measurements in a third example of the lens system of FIG. 1, when the second lens group is at three different locations, respectively, wherein S indicates a sagittal performance curve and T indicates a meridional performance curve.
Figure 22:
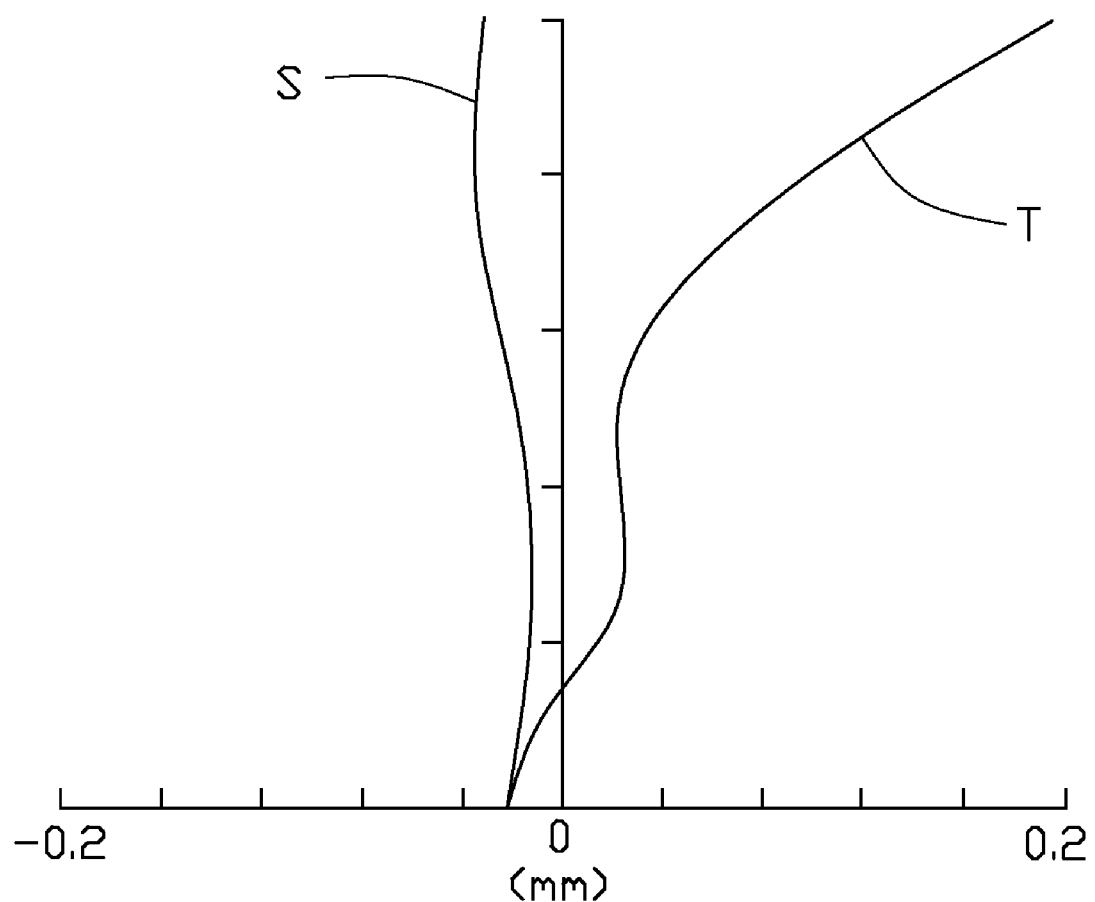
Figure 23:
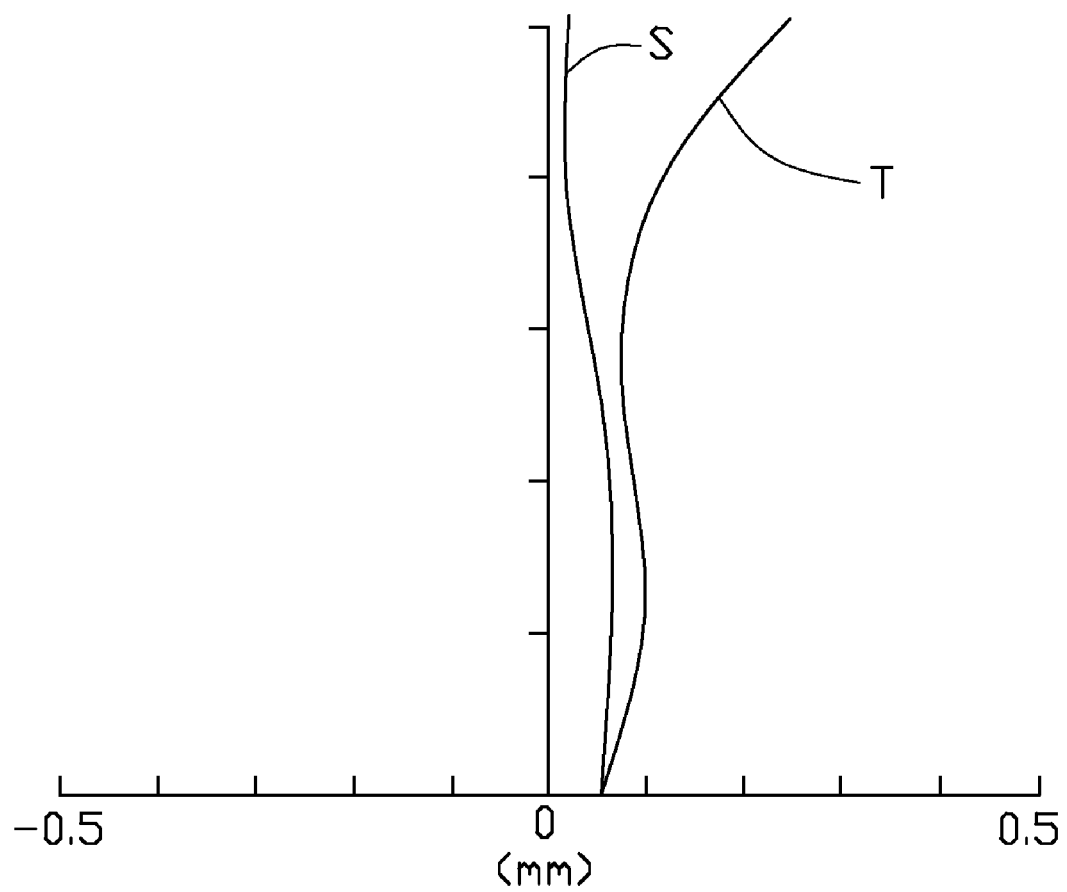
Figure 24:
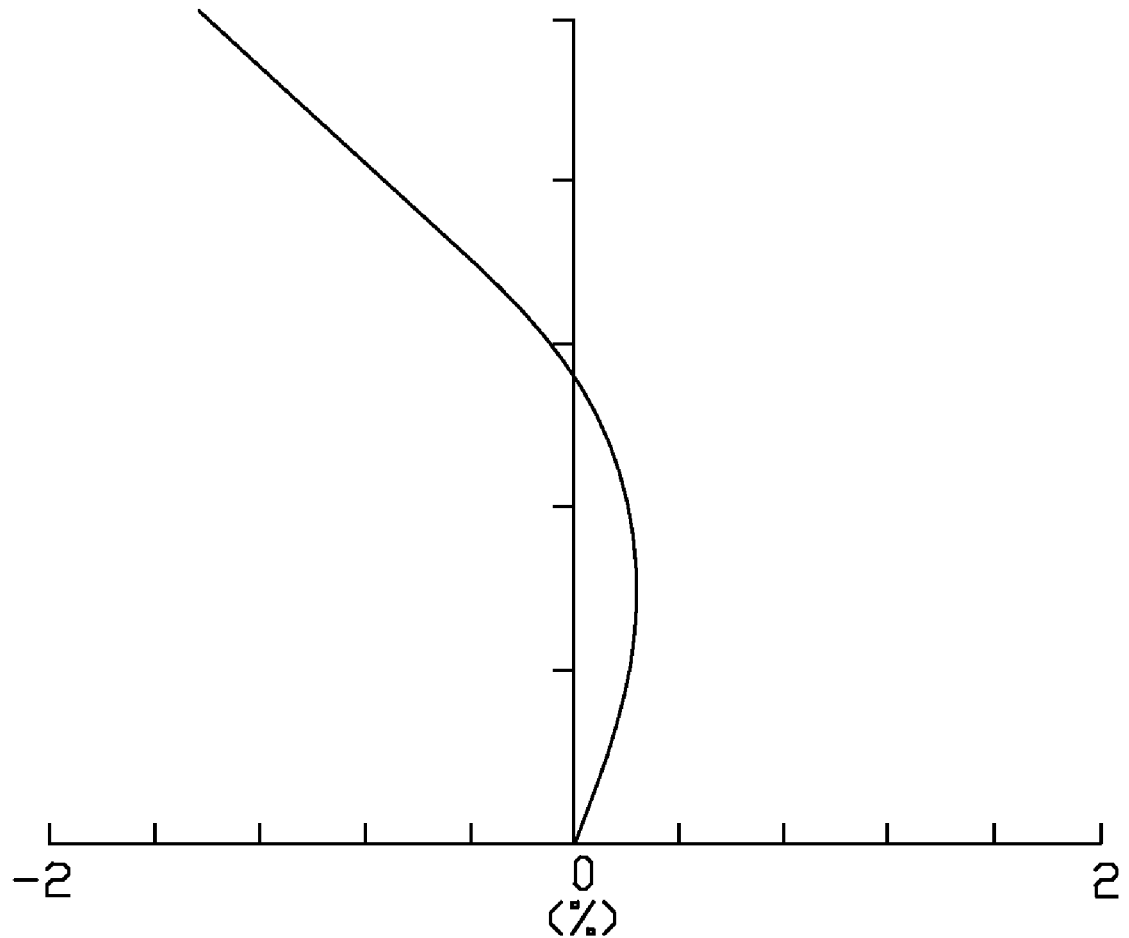
FIGS. 24-26 are graphs of distortion measurements in the third example of the lens system of FIG. 1, when the second lens group is at the three different locations, respectively.
Figure 25:
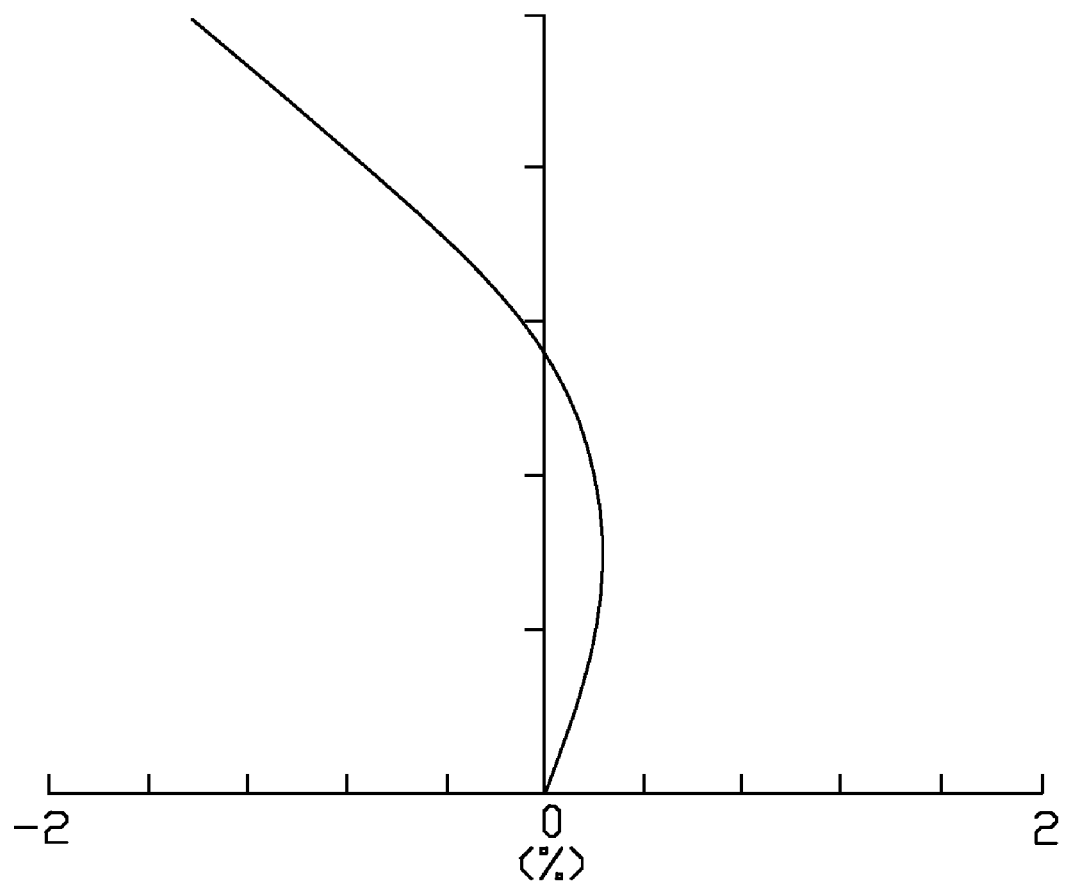
Figure 26:
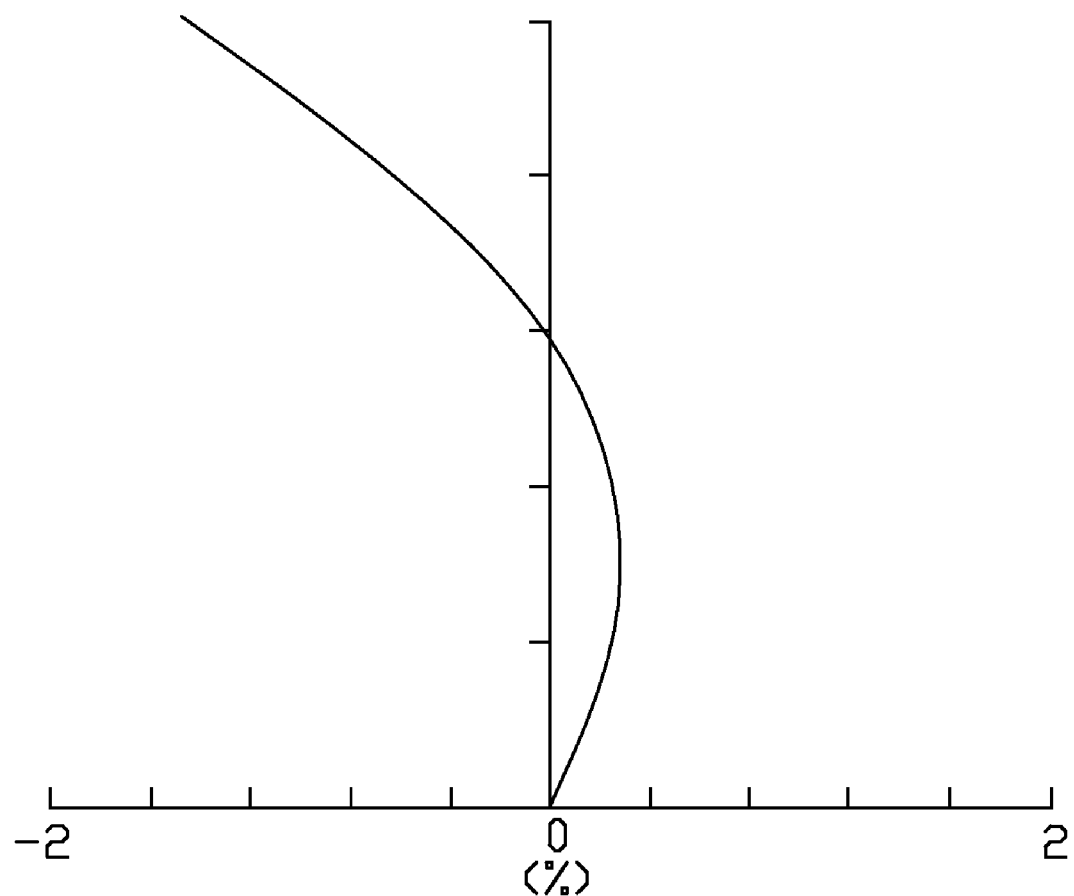
Figure 27:
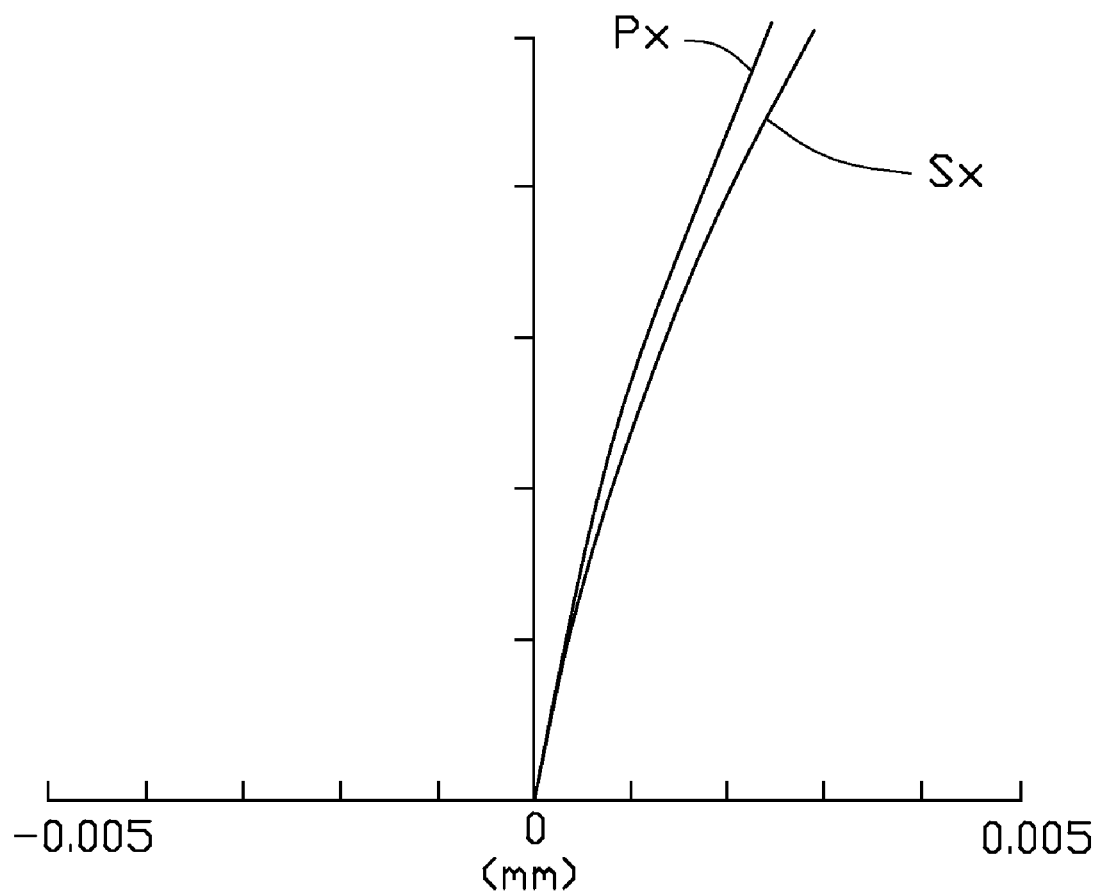
FIGS. 27-29 are graphs of chromatic aberration measurements in the third example of the lens system of FIG. 1, when the second lens group is at the three different locations, respectively, wherein Px indicates a primary chromatic aberration performance curve and Sx indicates a secondary chromatic aberration performance curve.
Figure 28:
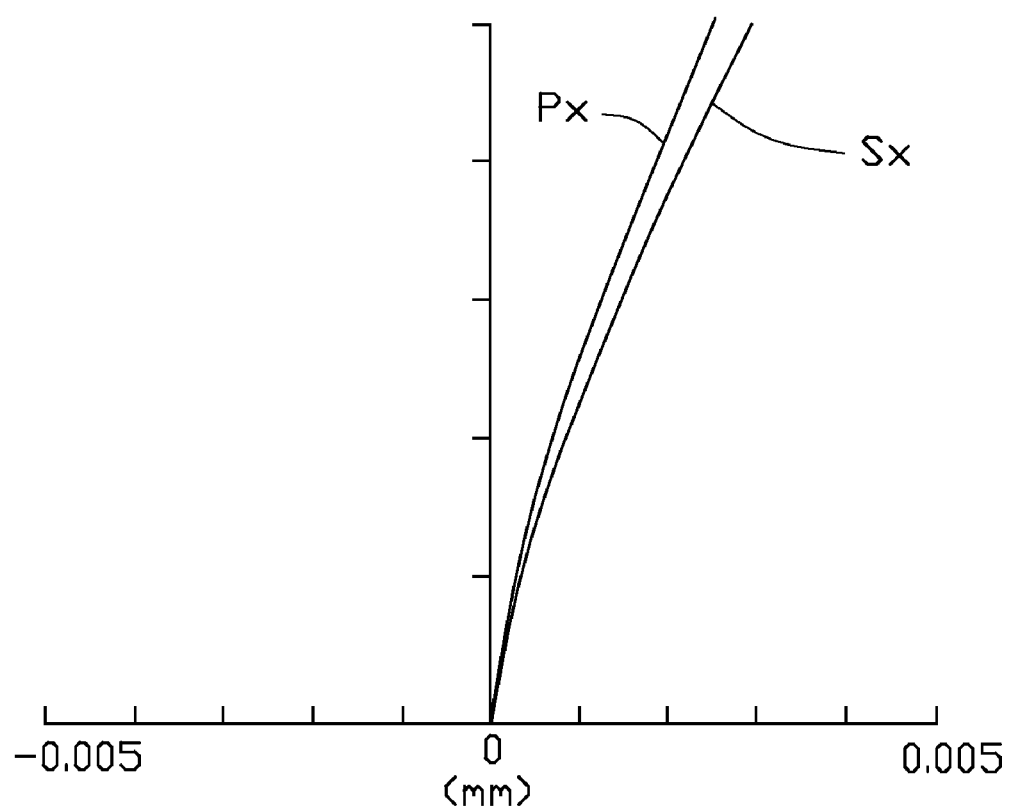
Figure 29:
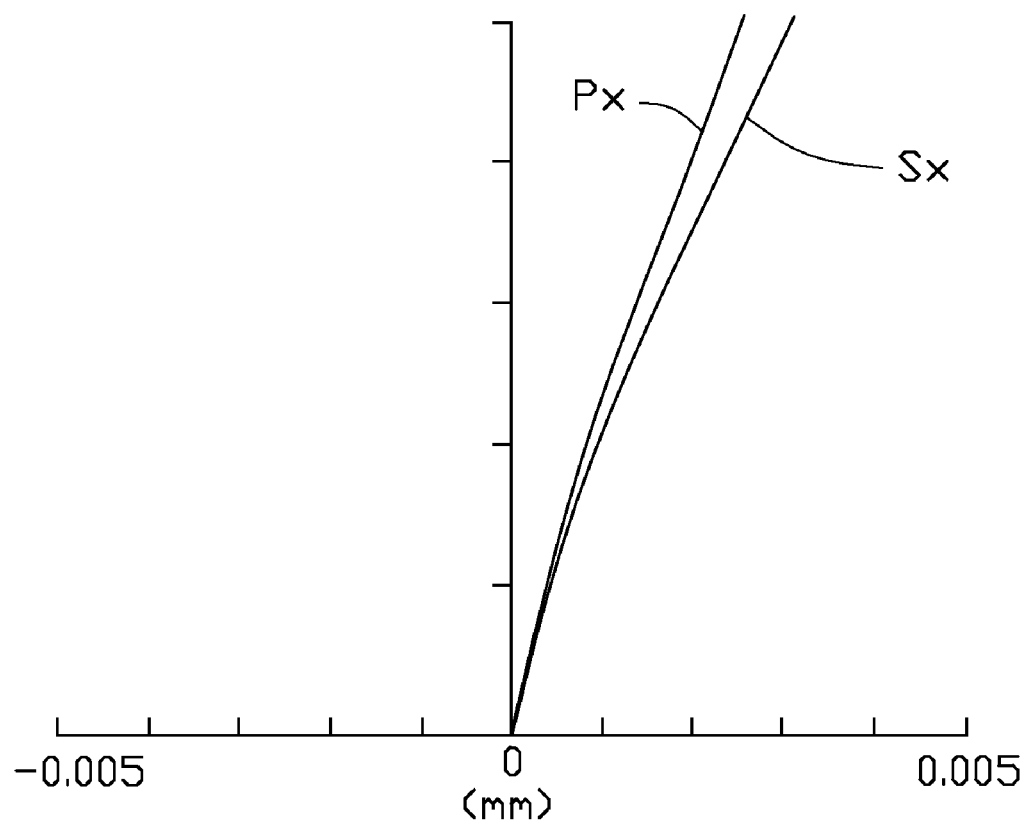

FIGS. 21-23 show that the sagittal astigmatism and the meridional astigmatism of the lens system 100 in the third example are maintained in a range from about −0.5 mm to about 0.5 mm. FIGS. 24-26 show that the lens system 100 in the third example has a high optical performance with distortion less than 2%. FIGS. 27-29 show that the primary chromatic aberration and the secondary chromatic aberration of the lens system 100 in the third example are maintained in a range from about −0.001 mm to about 0.001 mm.

As is clear from FIGS. 2-29, a variety of aberrations can be well compensated from an infinity position to a close-up position when the lens system 100 satisfies conditional expressions (1) to (4); and the lens system 100 is capable of performing very well as a macro lens.

It is to be understood, however, that even though numerous characteristics and advantages of various embodiments have been set forth in the foregoing description together with details of the structures and functions of the embodiments, the disclosure is illustrative only; and that changes may be made in detail, especially in matters of shape, size, and arrangement of parts within the principles of the invention to the full extent indicated by the broad general meaning of the terms in which the appended claims are expressed.

What is claimed is:

1. An internally focusing lens system, comprising:
a first lens group with positive refractive power;
a second lens group with negative refractive power; and
a third lens group with positive refractive power, the first, second and third lens groups arranged in that order from an object side of the lens system to an image side of the lens system;
wherein the third lens group comprises at least one lens element, the second lens group is movable toward the image side and the first and third lens groups remain stationary during focusing of the lens system from an infinitely distant object to a nearby object, and the following conditions are satisfied:

$0.4 < |F/F3| < 5$, $0.2 < |FM/F3| < 2.5$, $0.1 < |D/TTL| < 0.3$, and $1 < |(R1-R2)/(R1+R2)| < 6$, wherein F is a focal length of the internally focusing lens system at the time of focusing of the infinitely distant object, F3 is a focal length of the third lens group, FM is a focal length of the internally focusing lens system at the time of focusing of the nearby object, D is a distance between the second lens group and the third lens group at the time of focusing of the infinitely distant object, TTL is a total track length of the internally focusing lens system, R1 is a radius of a surface on the object side of the last lens element in the third lens group, and R2 is a radius of a surface on the image side of the last lens element in the third lens group; and
wherein the TTL is in a range from 5 millimeters to 10 millimeters.

2. The internally focusing lens system of claim 1, wherein the first lens group comprises at least a first lens having positive refractive power.

3. The internally focusing lens system of claim 2, wherein the at least a first lens is a plurality of first lenses, and at least one of the first lenses comprises an aspherical surface.

4. The internally focusing lens system of claim 1, wherein the second lens group comprises a second lens having negative refractive power.

5. The internally focusing lens system of claim 4, wherein the second lens comprises an aspherical surface.

6. The internally focusing lens system of claim 4, wherein a material of the second lens is selected from the group consisting of plastics, polymers, glasses, ceramics, liquid material, liquid crystal, and mixtures thereof.

7. A lens system comprising:
a first lens group, a second lens group, and a third lens group in that order from an object side of the lens system to an image side of the lens system;
the first lens group having positive refractive power, the first lens group comprising, in order from the object side to the image side, a first lens having positive refractive power and a second lens having positive refractive power;
the second lens group having negative refractive power, the second lens group comprising a third lens having negative refractive power; and
the third lens group having positive refractive power, the third lens group comprising a fourth lens having positive refractive power;
wherein the second lens group is movable toward the image side and the first and third lens groups remain stationary during focusing of the lens system from an infinitely distant object to a nearby object, and the following conditions are satisfied:

$0.4 < |F/F3| < 5$, $0.2 < |FM/F3| < 2.5$, $0.1 < |D/TTL| < 0.3$, and $1 < |(R1-R2)/(R1+R2)| < 6$, wherein F is a focal length of the lens system at the time of focusing of the infinitely distant object, F3 is a focal length of the third lens group, FM is a focal length of the lens system at the time of focusing of the nearby object, D is a distance between the second lens group and the third lens group at the time of focusing of the infinitely distant object, TTL is a total track length of the lens system, R1 is a radius of a surface on the object side of the fourth lens in the third lens group, and R2 is a radius of a surface on the image side of the fourth lens in the third lens group; and wherein the TTL is in a range from 5 millimeters to 10 millimeters.

8. The lens system of claim 7, wherein at least one of the first lens and the second lens comprises an aspherical surface.

9. The lens system of claim 7, wherein the third lens comprises an aspherical surface.

10. The lens system of claim 7, wherein a material of the third lens is selected from the group consisting of plastics, polymers, glasses, ceramics, liquid material, liquid crystal, and mixtures thereof.

11. A device with image capturing function, the device comprising:
    a body;
    a lens module mounted on the body, the lens module comprising, in order from an object side of the lens module to an image side of the lens module:
    a first lens group with positive refractive power;
    a second lens group with negative refractive power; and
    a third lens group with positive refractive power;
    wherein the third lens group comprises at least one lens element, the second lens group is movable toward the image side and the first and third lens groups remain stationary during focusing of the lens module from an infinitely distant object to a nearby object, and the following conditions are satisfied:

$0.4 < |F/F3| < 5$, $0.2 < |FM/F3| < 2.5$, $0.1 < |D/TTL| < 0.3$, and $1 < |(R1-R2)/(R1+R2)| < 6$, wherein F is a focal length of the lens module at the time of focusing of the infinitely distant object, F3 is a focal length of the third lens group, FM is a focal length of the lens module at the time of focusing of the nearby object, D is a distance between the second lens group and the third lens group at the time of focusing of the infinitely distant object, TTL is a total track length of the lens module, R1 is a radius of a surface on the object side of the last lens element in the third lens group, and R2 is a radius of a surface on the image side of the last lens element in the third lens group; and wherein the TTL is in a range from 5 millimeters to 10 millimeters.

12. The device of claim 11, wherein the first lens group comprises at least a first lens having positive refractive power.

13. The device of claim 12, wherein the at least a first lens is a plurality of first lenses, and at least one of the first lenses comprises an aspherical surface.

14. The device of claim 11, wherein the second lens group comprises a second lens having negative refractive power.

15. The device of claim 14, wherein the second lens comprises an aspherical surface.

16. The device of claim 14, wherein a material of the second lens is selected from the group consisting of plastics, polymers, glasses, ceramics, liquid material, liquid crystal, and mixtures thereof.

* * * * *